(12) United States Patent
Fukatsu et al.

(10) Patent No.: US 12,405,590 B2
(45) Date of Patent: Sep. 2, 2025

(54) ANALYSIS APPARATUS, CONTROL METHOD THEREOF, AND ANALYSIS SYSTEM

(71) Applicant: Keyence Corporation, Osaka (JP)

(72) Inventors: Gen Fukatsu, Osaka (JP); Tetsuya Miyasaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 677 days.

(21) Appl. No.: 17/674,919

(22) Filed: Feb. 18, 2022

(65) Prior Publication Data

US 2022/0317650 A1 Oct. 6, 2022

(30) Foreign Application Priority Data

Apr. 1, 2021 (JP) .................................. 2021-062981

(51) Int. Cl.
*G05B 19/05* (2006.01)
*G05B 19/04* (2006.01)

(52) U.S. Cl.
CPC ........ *G05B 19/058* (2013.01); *G05B 19/0405* (2013.01)

(58) Field of Classification Search
CPC .............. G05B 19/058; G05B 19/0405; G05B 2219/14006
See application file for complete search history.

(56) References Cited

U.S. PATENT DOCUMENTS

| 6,249,711 B1* | 6/2001 | Aart ........................ G05B 19/05 700/27 |
| 10,986,266 B2 | 4/2021 | Tsujikawa |
| 11,188,048 B2 | 11/2021 | Miyasaka |

(Continued)

FOREIGN PATENT DOCUMENTS

| JP | 5661222 B1 | 1/2015 |
| JP | 201897662 A | 6/2018 |
| JP | 2020134987 A | 8/2020 |

OTHER PUBLICATIONS

U.S. Appl. No. 17/674,926, filed Feb. 18, 2022 (131 pages).

(Continued)

*Primary Examiner* — Christopher W Carter
(74) *Attorney, Agent, or Firm* — Kilyk & Bowersox, P.L.L.C.

(57) ABSTRACT

The present invention aims to efficiently perform analysis from enormous data by utilizing information other than a device and a variable held by a basic unit. In addition, another object thereof is to extract and report important data from an analysis result of the enormous data. An analysis apparatus includes: a storage section that stores PLC information different from a symbol value among pieces of information associated with a programmable logic controller; an execution engine that repeatedly executes a user program; an acquisition section that acquires operation record data including a plurality of time-series symbol values, the operation record data being collected by execution of the user program; and a processing section that outputs an analysis report obtained by analyzing an abnormal symbol that does not satisfy a normal condition regarding the acquired operation record data based on the PLC information stored in the storage section.

19 Claims, 21 Drawing Sheets

(56) References Cited

U.S. PATENT DOCUMENTS

| | | | |
|---|---|---|---|
| 2015/0073751 A1* | 3/2015 | Liao | G05B 19/058 |
| | | | 702/185 |
| 2017/0345224 A1* | 11/2017 | Itou | G05B 23/0267 |
| 2018/0267510 A1* | 9/2018 | Nishiyama | G05B 19/4183 |
| 2018/0284733 A1* | 10/2018 | Ueyama | G05B 19/0428 |
| 2019/0018385 A1 | 1/2019 | Soneda et al. | |
| 2020/0125060 A1 | 4/2020 | Fujimura | |
| 2021/0103264 A1 | 4/2021 | Nakamura | |
| 2021/0103265 A1 | 4/2021 | Fujimura | |
| 2021/0240154 A1 | 8/2021 | Miyasaka | |
| 2021/0364996 A1 | 11/2021 | Miyasaka | |

OTHER PUBLICATIONS

U.S. Appl. No. 17/674,944, filed Feb. 18, 2022 (93 pages).
Office Action issued in corresponding Japanese Patent Application No. 2021-062981 dated Oct. 28, 2024 (English translation only) (3 pages).

* cited by examiner

FIG. 8

USE STATUS DISPLAY — 801
DEVICE SELECTION(S) [MR(INTERNAL AUXILIARY RELAY) ▽]
PROGRAM SELECTION(S) [GLOBAL ▽]

SEARCH DIRECTION    SEARCH DIRECTION
○ UPWARD(U)         ● USE(E)          [SEARCH EXECUTION(F)]
● DOWNWARD(U)       ○ NON-USE(N)      [UPDATE(P)]
                    ○ COMPETITION(B)
— 802

JUMP(J) [          ]            [OPTION(O)]
— 803

|       | 0  | 1  | 2 | 3 | 4  | 5 | 6 | ... | 13 | 14 | 15 |
|-------|----|----|---|---|----|---|---|-----|----|----|----|
| MR00  | 1  | 1  | 4 | 3 | 0  | 0 | 0 | ... | 41 | 45 | 0  |
| MR100 | 8  | 55 | * | * | 79 | 2 | 0 | ... | 0  | 0  | 0  |
| MR200 | 3  | 3  | 2 | 3 | 3  | 3 | 2 | ... | 2  | 2  | 2  |
| MR300 | 28 | 0  | 0 | 0 | 0  | 0 | 0 | ... | 0  | 0  | 0  |
| ...   |... |... |...|...|... |...|...| ... |... |... |... |

810
| DEVICE NUMBER (811) | COMMENT (812) |
|---|---|
| MR00 | TEMPORARY CONTACT, CONSTANTLY ON |
| MR01 | TEMPORARY CONTACT, CONSTANTLY OFF |
| MR02 | EMERGENCY STOP OFF1 |
| MR03 | EMERGENCY STOP OFF2 |
| MR04 |  |
| MR05 |  |
| MR06 |  |
| MR07 | PREPARING OPERATION |
| MR08 | ENTIRELY BEING STOPPED |
| ... | ... |

820
| DEVICE NUMBER (821) | -\| \|- (822) | -( )- (823) |
|---|---|---|
| LR000 | * | * |
| LR100 |   | * |
| LR101 |   | * |
| LR300 | * |   |
| LR301 |   | * |

FIG. 9

| TYPE | NUMBER OF BITS |
|---|---|
| BITS | 1 |
| 1-WORD UNSIGNED INTEGER | 16 |
| 1-WORD SIGNED INTEGER | 16 |
| 2-WORD UNSIGNED INTEGER | 32 |
| 2-WORD SIGNED INTEGER | 32 |
| SINGLE-PRECISION FLOATING-POINT TYPE | 32 |
| DOUBLE-PRECISION FLOATING-POINT TYPE | 64 |

| DEVICE NUMBER | CURRENT VALUE | EXPRESSION FORMAT |
|---|---|---|
| DM0 | 100000 | DECIMAL NUMBER OF 32 BITS |
| DM0 | 100000 | ± DECIMAL NUMBER OF 32 BITS |
| DM0 | 34464 | DECIMAL NUMBER OF 16 BITS |
| DM0 | -31072 | ± DECIMAL NUMBER OF 16 BITS |
| DM0 | 1.4013E-40 | Float |
| DM0 | 1.39064994210316E-309 | Double Float |

ANALYSIS APPARATUS, CONTROL METHOD THEREOF, AND ANALYSIS SYSTEM

CROSS-REFERENCE TO RELATED APPLICATIONS

The present application claims foreign priority based on Japanese Patent Application No. 2021-062981, filed Apr. 1, 2021, the contents of which are incorporated herein by reference.

BACKGROUND OF THE INVENTION

1. Field of the Invention

The present invention relates to an analysis apparatus, a control method thereof, and an analysis system.

2. Description of Related Art

A programmable logic controller (PLC) is a controller that controls industrial machines such as manufacturing equipment, conveyance apparatuses, and inspection apparatuses in factory automation (Japanese Patent No. 5661222 and JP 2018-097662 A).

The PLC controls various expansion units, controlled equipment, and the like by executing a user program such as a ladder program created by a programmer.

Meanwhile, it is desired to collect and utilize data held by the PLC in order to monitor an operation of the PLC and operations of the industrial machines controlled by the PLC. The PLC includes a basic unit (CPU unit) and an expansion unit connected thereto. The basic unit controls the expansion unit by executing a user program such as a ladder program. The expansion unit controls the industrial machines according to a command from the basic unit, and returns control results to the basic unit.

In addition, data such as these control results is used for trouble analysis and quality control. Therefore, it is required to accumulate and analyze the data and to obtain an analysis result at an early stage for recovery. However, enormous data is stored in a case where data of all devices related to the PLC is recorded. Further, in order to identify an abnormal device, it is necessary to analyze such enormous data (of all devices), which is time-consuming work. In addition, experience and knowledge are also required in order to identify the abnormal device from enormous analysis results or to restore a system. Therefore, there is a demand for a mechanism that efficiently analyzes enormous data related to the respective devices and displays an analysis result without requiring sufficient specialized knowledge and experience.

SUMMARY OF THE INVENTION

Therefore, in view of the above problems, an object of the present invention is to efficiently perform analysis from enormous data by utilizing information other than a device and a variable held by a basic unit. In addition, another object thereof is to extract and report important data from an analysis result of the enormous data.

According to one embodiment of the invention, provided is, for example, an analysis apparatus including: a storage section that stores PLC information different from a symbol value among pieces of information associated with a programmable logic controller; an execution engine that repeatedly executes a user program; an acquisition section that acquires operation record data including a plurality of time-series symbol values, the operation record data being collected by execution of the user program; and a processing section that outputs an analysis report obtained by analyzing an abnormal symbol that does not satisfy a normal condition regarding the acquired operation record data based on the PLC information stored in the storage section.

According to the present invention, a user is provided with information of a device that behaves differently from usual.

BRIEF DESCRIPTION OF THE DRAWINGS

FIG. 2 is a diagram illustrating hardware of a PC 2a;
FIG. 8 is a diagram illustrating information associated with the PLC;
FIG. 9 is a diagram illustrating information associated with the PLC.

DETAILED DESCRIPTION OF PREFERRED EMBODIMENTS

Hereinafter, an embodiment will be described in detail with reference to the accompanying drawings. Note that the following embodiment does not limit the invention according to the claims, and all combinations of characteristics described in the embodiment are not necessarily essential for the invention. Two or more characteristics of the plurality of characteristics described in the embodiment may be arbitrarily combined. In addition, the same or similar configurations are denoted by the same reference signs, and redundant descriptions thereof are omitted. A lower-case alphabet is sometimes added to the end of the reference sign in order to distinguish a plurality of configurations. The lower case alphabet is sometimes omitted when matters common to the plurality of configurations are described.

<System Configuration>

First, in order to enable whose skilled in the art to better understand a programmable logic controller (PLC, which may be simply referred to as a programmable controller), a configuration of a general PLC and the operation thereof will be described.

Figure 1:
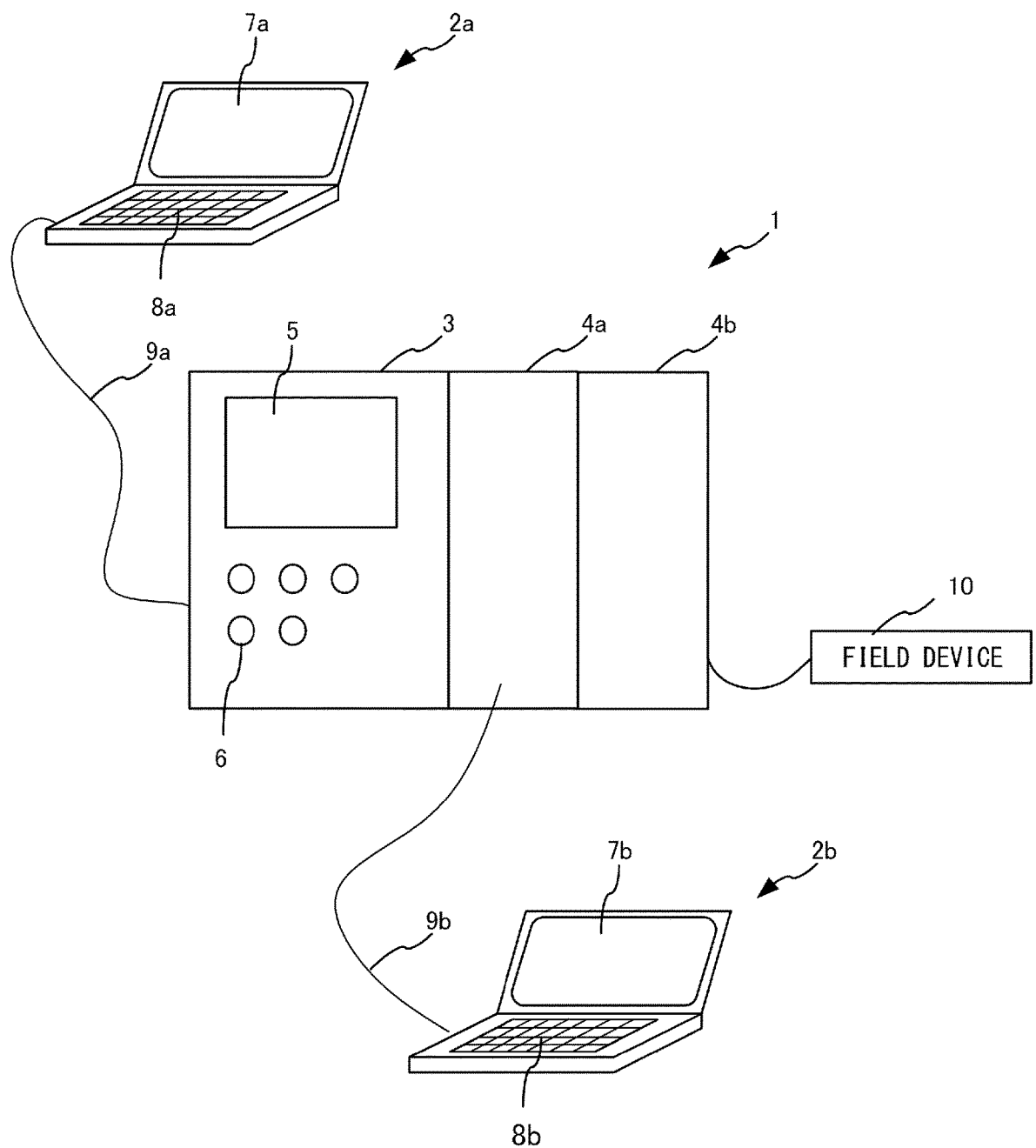
FIG. 1 is a diagram illustrating a PLC system.

FIG. 1 is a conceptual diagram illustrating a configuration example of a PLC system according to the embodiment of the present invention. As illustrated in FIG. 1, the PLC system includes: a PC 2a that edits a user program such as a ladder program; a PC 2b that displays an analysis result; a PLC 1 that performs the integrated control of various industrial machines installed in a factory or the like; and a field device 10 such as a camera connected to the PLC 1. The PC is an abbreviation for personal computer. Note that configurations and control of the PC 2a and the PC 2b are described in a case where the PC 2 is simply described hereinafter. The user program may be created using a graphical programming language such as a ladder language and a flowchart-format motion program such as a sequential function chart (SFC), or may be created using a high-level programming language such as C language. Hereinafter, the user program executed by a basic unit 3 is assumed to be the ladder program for convenience of the description. The PLC 1 includes the basic unit 3 incorporating a CPU, and one or a plurality of expansion units 4. The one or plurality of expansion units 4 are detachable from the basic unit 3.

The basic unit 3 includes a display part 5 and an operation part 6. The display part 5 can display an operation status and the like of each of the expansion units 4 attached to the basic unit 3. The display part 5 switches a display content according to an operation content of the operation part 6. The display part 5 typically displays a current value (device value) of a device in the PLC 1, error information generated in the PLC 1, and the like. Here, the device includes various devices (a relay, a timer, a counter, and the like) included in the basic unit 3 and the expansion unit 4, also refers to an area on a memory provided to store a device value (device data), and may be referred to as a device memory. Note that the device memory is a non-volatile memory and may be configured using a rewritable non-volatile ROM, and the non-volatility may be achieved using a non-volatile RAM or the like by battery backup or the like. The ROM is an abbreviation for read-only memory. The RAM is an abbreviation for random access memory. The device value is information indicating an input state from input equipment, an output state to output equipment, or a state of an internal relay (auxiliary relay), a timer, a counter, a data memory, or the like set on the user program. Types of the device value include a bit type, a word type, and the like. A bit device stores a 1-bit device value, for example, 0/1, ON/OFF, H/L, or the like. A word device stores a device value of one word. As the device, a variable may be designated as a collection target of a data utilization program to be described in detail below. The variable is also a holding section that holds information, and is accessed by an execution engine according to the user program. Therefore, the device also refers to the variable in the following description. Note that a memory holding the device may be referred to as a device memory. In addition, a memory holding collected data may be referred to as a data memory. The PLC 1 may be configured to handle the variable in addition to the device. The device and the variable are referred to as symbols, and a value indicated by the symbol is referred to as a symbol value.

The expansion unit 4 is prepared for expanding a function of the PLC 1. A field device (controlled apparatus) 10 corresponding to a function of the expansion unit 4 is sometimes connected to the expansion unit 4, whereby each field device 10 is connected to the basic unit 3 via the expansion unit 4. The field device 10 may be input equipment such as a sensor and a camera, or may be output equipment such as an actuator. In addition, a plurality of field devices may be connected to one expansion unit 4.

For example, the expansion unit 4b may be a positioning unit that drives a motor (the field device 10) to position a workpiece, or may be a counter unit. The counter unit counts a signal from an encoder (the field device 10) such as a manual pulsar.

An analysis unit 4a collects symbol values from symbols (device, variables and the like) in the basic unit 3, analyzes the symbol values, and creates an analysis report including an analysis result. The analysis unit 4a may have a web server that provides the analysis report to the external PC 2b. The basic unit 3 is sometimes also referred to as the CPU unit. The system including the PLC 1 and the PC 2 may be referred to as a programmable logic controller system. Although an example in which the analysis unit 4a collects data of each device is described in the present embodiment, such a collector may be provided in the basic unit 3 or may be provided in another expansion unit. In addition, the analysis unit 4a can also function as an analysis apparatus that analyzes the collected data according to an instruction from the basic unit 3 or a predetermined timing. Note that an example in which the analysis unit 4a operates as the analysis apparatus is described in the present embodiment, but there is no intention to limit the present invention, and the basic unit 3 may function as the analysis apparatus, and an external apparatus such as the PCs 2a and 2b may function as the analysis apparatus. A flow (flow program) to be described below is merely an example of the data utilization program. The basic unit 3 is sometimes also referred to as the CPU unit. Note that the system including the PLC 1 and the PC 2 may be referred to as the programmable logic controller system.

The PC 2a is a computer that is operated mainly by a programmer. On the other hand, the PC 2b is a computer that is operated mainly by a field manager. The PC 2a may be referred to as a programming support apparatus (setting apparatus). The PC 2b may be a programmable display whose screen is set by a user. In this case, the screen displaying the analysis result and the like may be subjected to screen setting by the user, or may have a web browser function installed in advance such that the analysis result and the like is displayed by the web browser function. The PC 2 is, for example, a portable notebook type or tablet type personal computer or a smartphone, and is an external computer including a display part 7 and an operation part 8. The external computer is a computer outside the PLC 1. The ladder program, which is an example of the user program configured to control the PLC 1, is created using the PC 2a. The created ladder program is converted into a mnemonic code in the PC 2a. The PC 2 is connected to the basic unit 3 of the PLC 1 via a communication cable 9 such as a universal serial bus (USB) cable. For example, the PC 2a sends the ladder program converted into the mnemonic code to the basic unit 3. The basic unit 3 converts the ladder program into a machine code and stores the machine code in a memory provided in the basic unit 3. Note that the mnemonic code is transmitted to the basic unit 3 here, the present invention is not limited thereto. For example, the PC 2a may convert the mnemonic code into an intermediate code, and send the intermediate code to the basic unit 3.

Note that the operation part 8 of the PC 2 may include a pointing device such as a mouse connected to the PC 2 although not illustrated in FIG. 1. In addition, the PC 2 may be configured to be detachably connected to the basic unit 3 of the PLC 1 via another communication cable 9 other than the USB cable. In addition, the PC 2 may be connected to the basic unit 3 of the PLC 1 by wireless communication without using the communication cable 9.

<Programming Support Apparatus>

Figure 2:
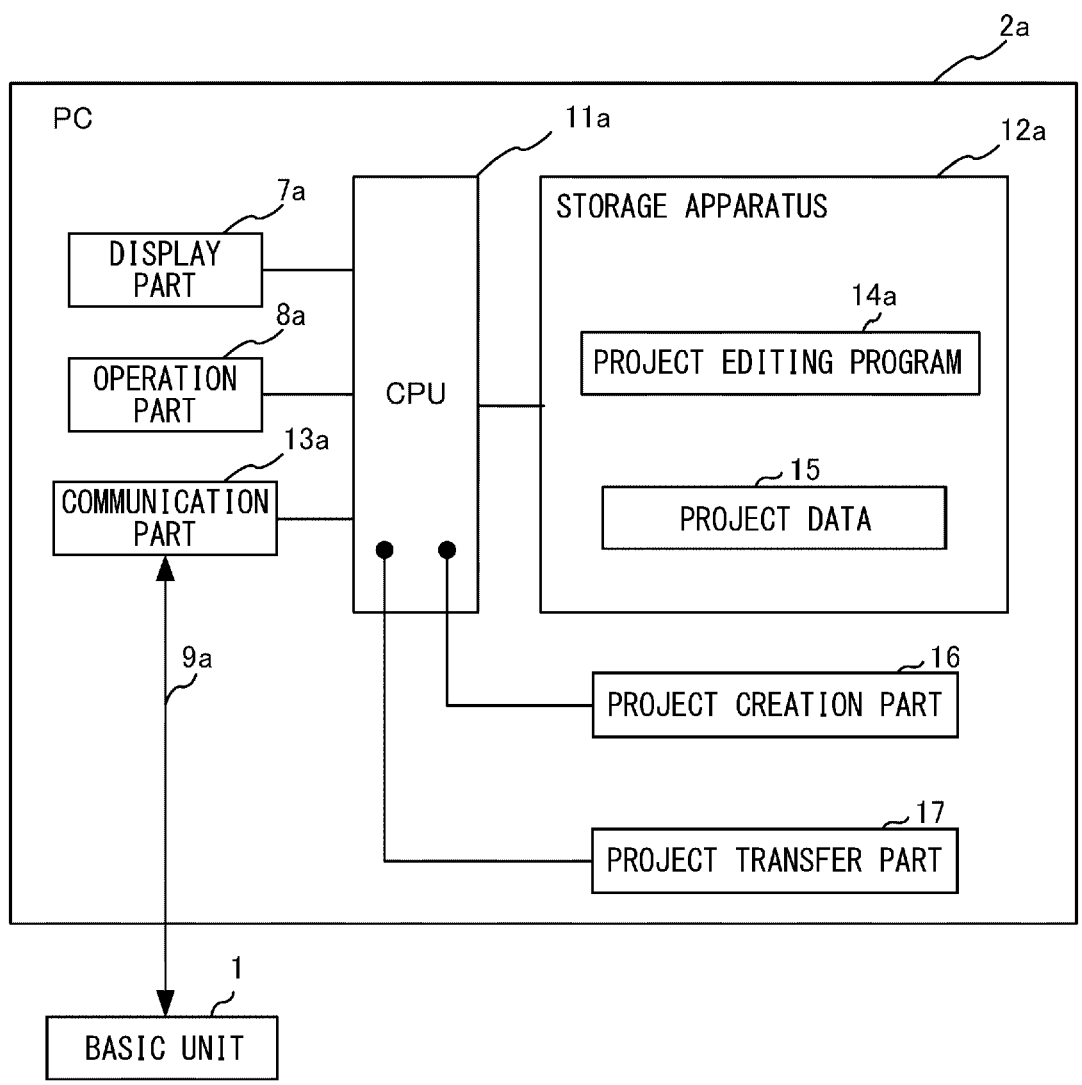

FIG. 2 is a block diagram illustrating an electrical configuration of the PC 2*a*. As illustrated in FIG. 2, the PC 2*a* includes a CPU 11*a*, a display part 7 *a*, an operation part 8*a*, a storage apparatus 12*a*, and a communication part 13*a*. The display part 7*a*, the operation part 8*a*, the storage apparatus 12 *a*, and the communication part 13*a* are electrically connected to the CPU 11*a*. The storage apparatus 12*a* includes a RAM, a ROM, an HDD, and an SSD, and may further include a detachable memory card. The CPU is an abbreviation for central processing unit. The HDD is an abbreviation for hard disk drive. The SSD is an abbreviation of solid state drive.

A user of the PC 2*a* causes the CPU 11*a* to execute a project editing program 14*a* stored in the storage apparatus 12*a*, and edits project data 15 through the operation part 8*a*. That is, the PC 2*a* is an engineering tool and functions as the programming support apparatus. As the CPU 11*a* executes the project editing program 14*a*, a project creation part 16 and a project transfer part 17 are implemented. The project creation part 16 creates the project data 15 according to the user input. The project transfer part 17 transfers the project data 15 to the PLC 1. The project data 15 includes one or more user programs (e.g., the ladder program, a control program, a motion program, and the data utilization program), configuration information of the basic unit 3 and the expansion unit 4, drawing data of WebHMI, setting information of specific functions provided in the basic unit 3 and the expansion unit 4, and the like. The configuration information includes connection positions of the plurality of expansion units 4 with respect to the basic unit 3 and allocation information of the device. The configuration information may include information indicating functions provided in basic unit 3 (e.g., data collection function, communication function, and positioning function) and information indicating functions of the expansion unit 4 (e.g., communication function, positioning function, and photographing function). The drawing data is a display component group configured to implement WebHMI, and is achieved by markup data describing a structure of a front end, for example, HTML data, style data describing a decoration, for example, CSS data, a code describing dynamic processing, for example, a JavaScript (registered trademark) code, and the like. The style data describing the decoration may be provided, for example, in a file format, and may be called by a description calling an external style data file in the markup data describing the structure. The code describing the dynamic processing may be provided, for example, in a file format, and may be called by a description calling an external code file in the markup data describing the structure. The front end in a format that can call and use the external style data file and the external code file has high reusability and maintainability, and for example, a general-purpose front end component or the like can be used. Hereinafter, the drawing data is referred to as a display component. The data utilization program includes a program configured to collect control data (such as device values) in the PLC 1, process data, and create data to be passed to WebHMI. The setting information of the specific functions includes setting information related to the functions (e.g., data collection function, communication function, and positioning function) provided in the basic unit 3, for example setting information of a data collection condition and a data collection target in the case of the data collection function, and includes setting information setting information related to the functions (e.g., communication function, positioning function, data utilization function, and photographing function) of the expansion unit 4 and the like. Here, the editing of the project data 15 includes creating and changing (re-editing) of the project data 15. The user can read the project data 15 stored in the storage apparatus 12*a* as necessary, and change this project data 15 using the project editing program 14*a*. The communication part 13*a* communicates with the basic unit 3 via a communication cable 9*a*. The project transfer part 17 transfers the project data to the basic unit 3 via the communication part 13*a*. The communication part 13*a* communicates with the analysis unit 4*a* via a communication cable 9*b*.

<PC Used for Display of Dashboard>

Figure 3:
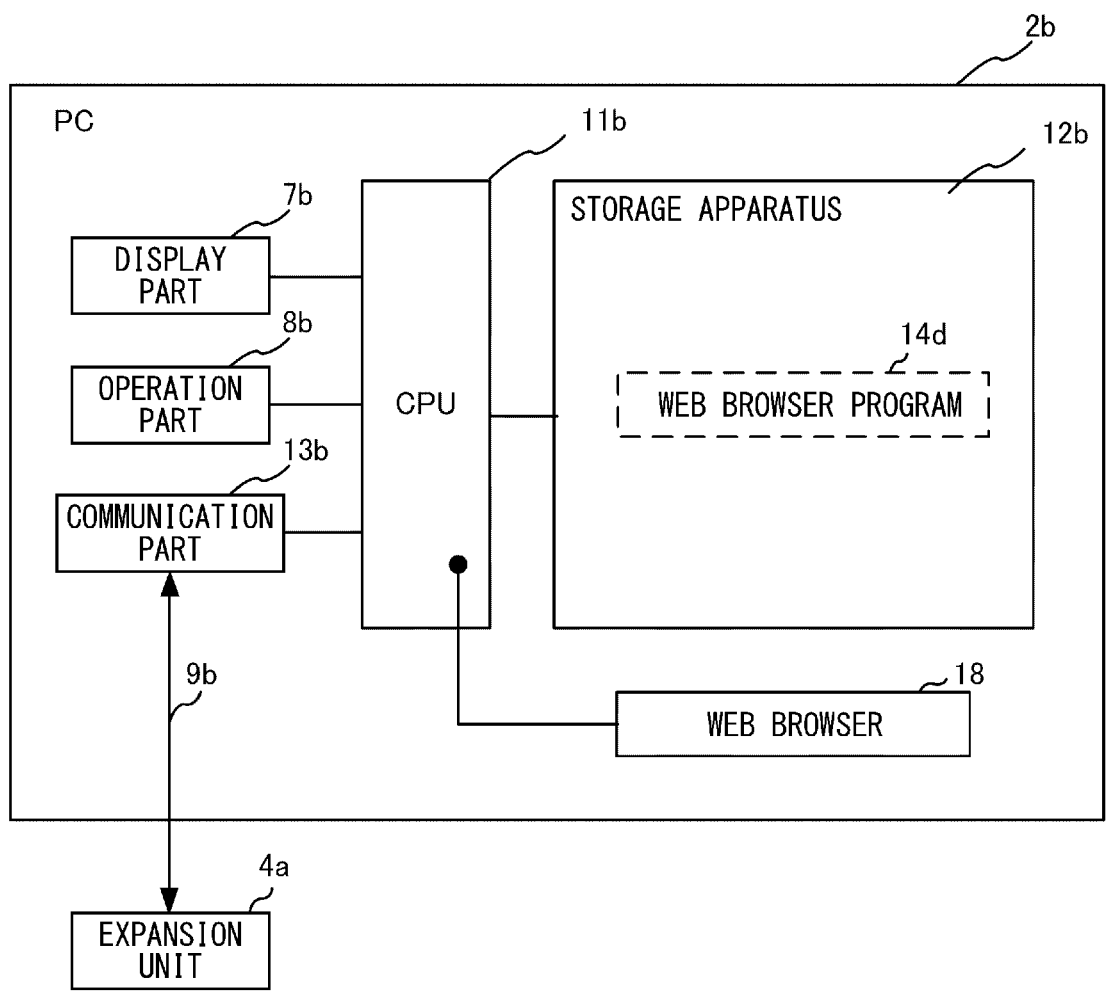
FIG. 3 is a diagram illustrating hardware of a PC 2b.

FIG. 3 is a block diagram illustrating an electrical configuration of the PC 2*b*. As illustrated in FIG. 3, the PC 2*b* includes a CPU lib, a display part 7*b*, an operation part 8*b*, a storage apparatus 12*b*, and a communication part 13*b*. The display part 7*b*, the operation part 8*b*, the storage apparatus 12*b*, and the communication part 13*b* are electrically connected to the CPU lib. The storage apparatus 12*b* includes a RAM, a ROM, an HDD, and an SSD, and may further include a detachable memory card.

The CPU lib executes a web browser program 14*d* to implement a web browser 18. The web browser 18 accesses a setting page of the data utilization application provided by the analysis unit 4*a* or accesses a page of a dashboard via the communication part 13*b*. In addition, the CPU lib displays an identified result on the display part 7*b* according to screen information indicating the identified result (determination result) at the time of occurrence of an abnormality transmitted from the analysis unit 4*a*.

<PLC>

Figure 4:
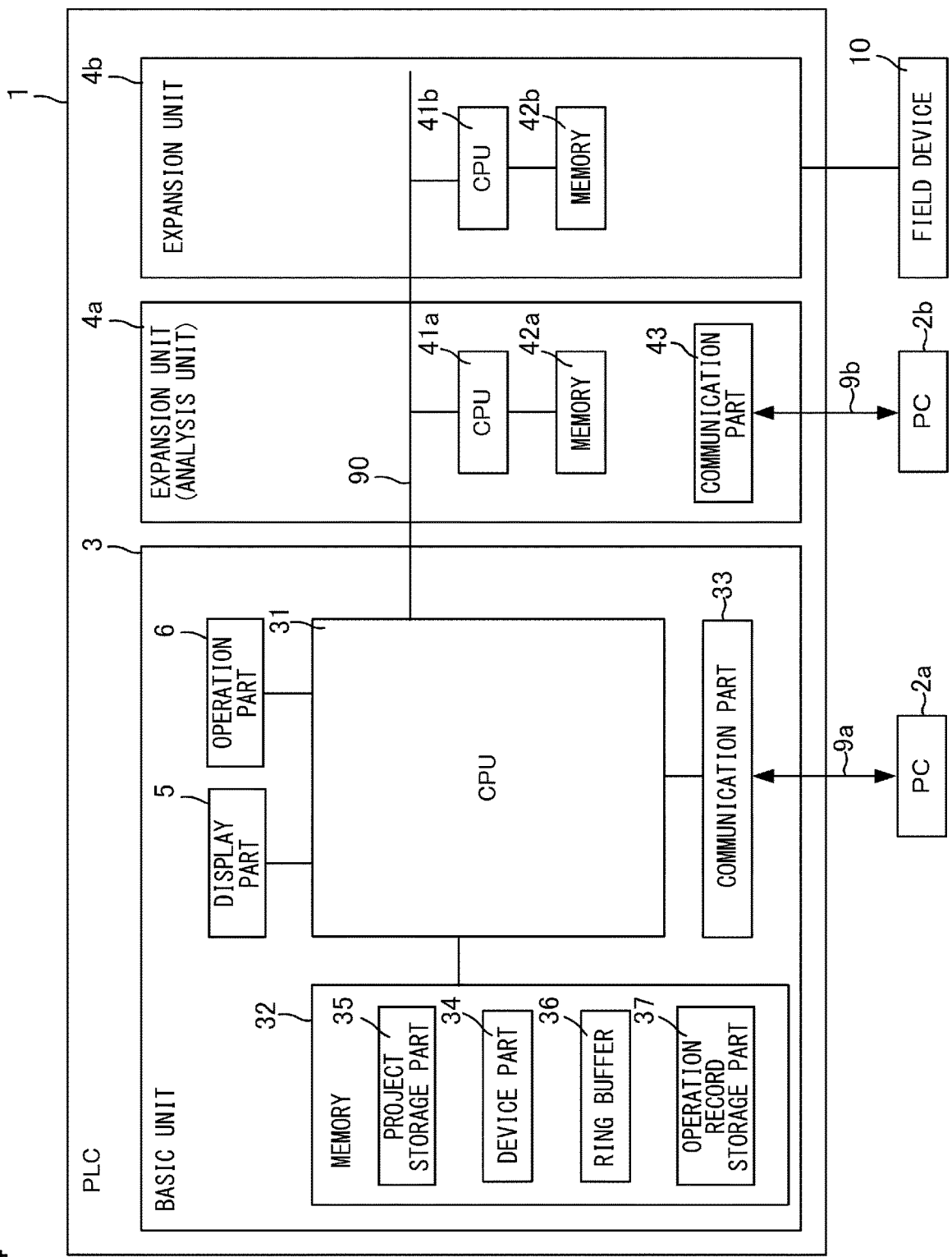
FIG. 4 is a diagram illustrating hardware of a PLC.

FIG. 4 is a block diagram illustrating an electrical configuration of the PLC 1. As illustrated in FIG. 4, the basic unit 3 includes a CPU 31, a display part 5, an operation part 6, a storage apparatus 32, and a communication part 33. The display part 5, the operation part 6, the storage apparatus 32, and the communication part 33 are electrically connected to the CPU 31. The storage apparatus 32 may include a RAM, a ROM, a memory card, and the like. The storage apparatus 32 includes a plurality of storage areas such as a device part 34, a project storage part 35, a ring buffer 36, and an operation record storage part 37.

Here, an operation record is a record of an operation state of the PLC 1 at a scan time level, and is obtained by recording, for example, symbol values and collection times of all symbols related to the operation of the PLC 1 in time series per scan. For example, all the symbols related to the operation may be all symbols used in the user program such as the ladder program, or may be all symbols included in units of a program or units of a unit selected by the user. In this case, symbols, which are targets of the operation record, may be collectively selectable in significant units such as the units of the program or the unit, and the symbols may be addable or removable individually. As a result, for example, when trouble occurs, the operation record is generated by recording symbol values and collection times of all symbols related to the operation of the PLC 1 before and after a trouble occurrence time in time series per scan, so that it is possible to accurately grasp what has happened at the time of occurrence of the trouble even afterward based on the operation record. The operation record includes a lot of information in order to reproduce a status at that time, but can be selected in the units of the program or the unit by a user who is a collection target because the data volume of the operation record becomes large so that it becomes difficult to handle the operation record and or a load is applied to the collection of the operation record when there are a lot of information.

In addition, the operation record may include time-series camera images together with capturing times in addition to the symbols. As a result, for example, when trouble occurs, it is possible to accurately grasp what has happened at the occurrence time of the trouble even afterward, and it is possible to record camera images in conjunction with the time series of the user program by including the camera images indicating changes in appearance of a facility in the operation record. A writing history from external equipment such as a human machine interface (HMI) or a PC or a writing history from the PLC may be included in the operation record as a change point event. As a result, for example, it is possible to confirm in time series what kind of change point event has occurred before and after the occurrence of the trouble.

The device part 34 includes a bit device, a word device, and the like, and each of the devices stores a device value. The project storage part 35 stores the project data transferred from the PC 2*a*. The ring buffer 36 periodically collects and stores the device values from the device part 34. When a predetermined event occurs, the operation record storage part 37 stores an event record including device values collected around the occurrence time (before the occurrence time, after the occurrence time, or before or after the occurrence time) and collection times thereof. An event is, for example, that a warning condition or a caution condition set for each device is satisfied. The warning condition is, for example, a condition under which a manufacturing line control operation performed by the PLC 1 need to be stopped. The caution condition is, for example, a condition of a device value that an administrator need to pay attention to the manufacturing line control operation performed by the PLC 1. The CPU 31 transmits the event record to the PC 2*a* in response to a request from the PC 2*a*. In addition, the CPU 31 may provide the device value to the PC 2*a* in real time. The storage apparatus 32 also stores a control program executed by the CPU 31 of the basic unit 3. As illustrated in FIG. 3, the basic unit 3 and the expansion unit 4 are connected via a unit internal bus 90 which is a type of expansion bus. Note that a communication function related to the unit internal bus 90 is mounted on the CPU 31, but may be mounted as a part of the communication part 33. The communication part 33 may include a serial communication circuit conforming to a USB standard or the like. The CPU 31 receives the project data from the PC 2*a* via the communication part 33.

Here, the unit internal bus 90 will be supplementarily described. The unit internal bus 90 is a communication bus used for input/output refresh. The input/output refresh is processing of updating the device value between the basic unit 3 and the expansion unit 4. The input/output refresh is executed every time the ladder program is executed once (that is, every scan).

The expansion unit 4 includes a CPU 41 and a memory 42. A CPU 41*b* of the expansion unit 4*b* controls the field device 10 according to an instruction (device value) from the basic unit 3 stored in the device. Note that the expansion unit 4*b* functions as a camera control unit in the present embodiment. In addition, the CPU 41*b* stores a control result of the field device 10 such as a camera in a device called a buffer memory. The control result stored in the device is transferred to the basic unit 3 by the input/output refresh. In addition, the control result stored in the device is sometimes transferred to the basic unit 3 according to a read command from the basic unit 3 even at a different timing from the input/output refresh. The memory 42 includes a RAM, a ROM, and the like. In particular, a storage area used as the buffer memory is secured in the RAM. The memory 42 may have a buffer that temporarily holds data (e.g., still image data or moving image data) acquired by the field device 10.

A CPU 41*a* of the analysis unit 4*a* functioning as a data utilization unit (analysis unit) communicates with the PC 2*b* via a communication part 43 and the communication cable 9*b*. The communication part 43 includes a communication circuit that executes network communication. The CPU 41*a* analyzes a device value collected in the basic unit 3 to create an analysis report including an analysis result. For example, the CPU 41*a* executes an operation record analysis application as the data utilization application to analyze symbol values included in operation record data, thereby identifying an abnormal symbol and a time when the symbol becomes abnormal, and creating an analysis report including an analysis result in which the abnormal symbol and the time when the symbol becomes abnormal are associated with each other. The operation record data includes information for reproducing a status around a saved event occurrence time of the operation record, and thus, may be managed in association with the analysis report. In addition, the operation record data includes symbol values of many symbols in order to reproduce the status around the saved event occurrence time of the operation record, and thus, has a large data size. Thus, for example, the CPU 41*a* may read data necessary for the analysis report out of the operation record data and additionally save the read data as data for the analysis report in the operation record data. As the data for the analysis report, data originally included in the operation record data and necessary for the analysis report may be copied without any change to additionally save the copied data in the operation record data with a tag as the data for the analysis report, or may be subjected to data processing for the analysis report and additionally saved in the operation record data.

When a camera image is included in the operation record data, it is possible to grasp the status around the saved event occurrence time of the operation record in more detail by reproducing the camera image. The analysis report may include a user interface (UI) for reproducing the camera image. Since the camera image has a large data size, only camera image data required when a click or scroll operation is received in the UI for reproducing the camera image may be partially downloaded. For example, when creating the analysis report, the CPU 41*a* may process the camera image according to the display order in the analysis report, or generate index information indicating a correspondence relationship between a time and a saving position of the camera image such that the camera image corresponding to the time can be partially downloaded at a high speed.

In a narrow sense, the analysis report means the analysis result itself, but, in a broad sense, the analysis report may mean a web application that displays the analysis result or a user interface thereof. The CPU 41*a* determines, for example, whether a device value is within a normal range, whether a timing at which the device value changes is within a normal range, and the like. Whether the timing at which the device value changes is within the normal range may be, for example, whether a length of a period during which the device value is "1" (ON) is within a normal range. In addition, it may be determined whether or not the number of changes of a device value in a certain process or cycle is within a normal range. When a device value collected from a certain device does not satisfy a normal condition, the device may be called an abnormal device because the device behaves differently from usual. The CPU 41a may create an analysis report in a web format and provide the analysis report to the web browser of the PC 2b via the communication part 43 and the communication cable 9b. When the CPU 31 has a protocol conversion function, the CPU 41a may transmit the analysis report to the PC 2a via the unit internal bus 90, the CPU 31, the communication part 33, and the communication cable 9a. The analysis report may include a graph display component, a numerical value display component, or the like. These display components are achieved by markup data describing a structure of a front end, style data describing a decoration, and a code describing dynamic processing, for example, HTML data, CSS data, and a JavaScript (registered trademark) code. The HTML is an abbreviation for hypertext markup language. The CSS is an abbreviation for cascading style sheet.

<Function of PC 2b>

Figure 5:
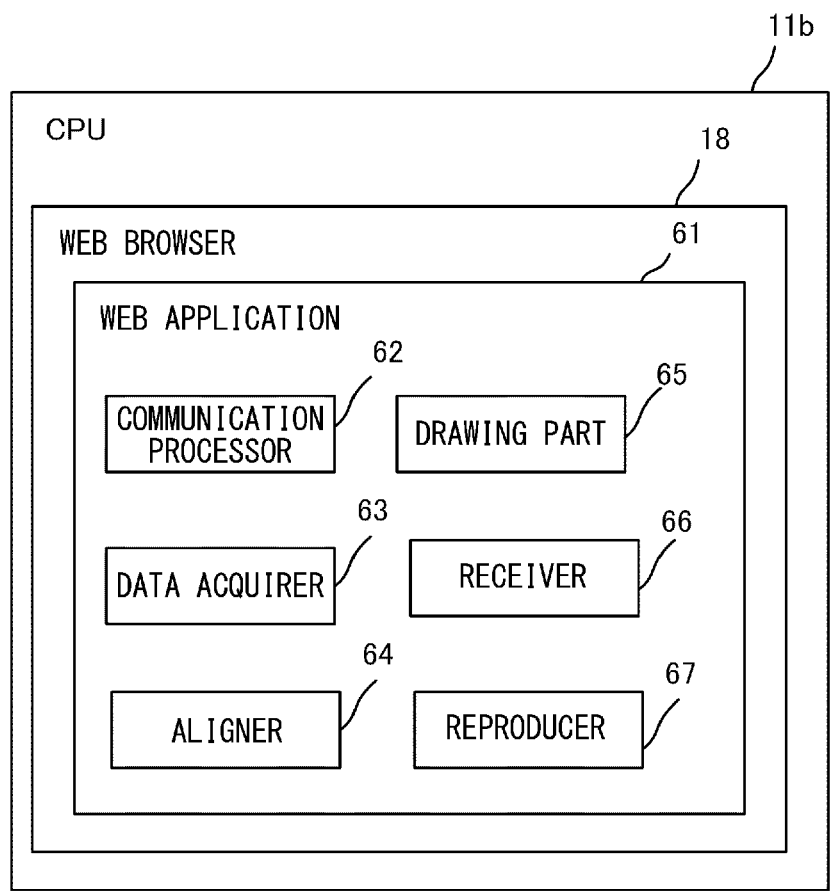
FIG. 5 is a diagram illustrating functions implemented by a CPU of a PC.

FIG. 5 is a diagram illustrating functions implemented by the CPU 1b of the PC 2b. The CPU 1b of the PC 2b executes the web browser program 14d to execute the web browser 18. The web browser 18 executes the web application 61 to implement functions of a communication processor 62, a data acquirer 63, a drawing part 65, a receiver 66, and a reproducer 67. In addition, the web browser 18 communicates with a web server 82 of the analysis unit 4a, which will be described later, according to a hypertext transport protocol (HTTP) to receive a display component.

The web browser 18 executes the web application 61 to display an analysis report on the display part 7b. The web application 61 includes, for example, HTML data, CSS data, and a Java® script. The web application 61 may be provided from the analysis unit 4a. The communication processor 62 processes communication with the web server 82. The data acquirer 63 acquires operation record data that needs to be displayed in the analysis report from the analysis unit 4a. The operation record is downloaded and stored in the storage apparatus 12b. The drawing part 65 displays the analysis report on the display part 7b. An aligner 64 executes time management such that a reproduction time of the analysis report and a reproduction time of the operation record are synchronized with each other.

The receiver 66 receives an operation or the like on a result display screen of the analysis report. The reproducer 67 downloads the operation record data to be saved in the storage apparatus 12b in response to a reproduction request input from the receiver 66 or the aligner 64, for example. The reproduction request may include, for example, identification information (e.g., unique identification information or a save path name in the PLC 1) that can identify the operation record. The reproducer 67 reproduces the operation record saved in the storage apparatus 12 and displays the same on the display part 7. The reproducer 67 may display a waveform of time-series device values acquired in real time from the PLC 1, or display a waveform of time-series device values included in the operation record.

<Function of PLC 1>

Figure 6:
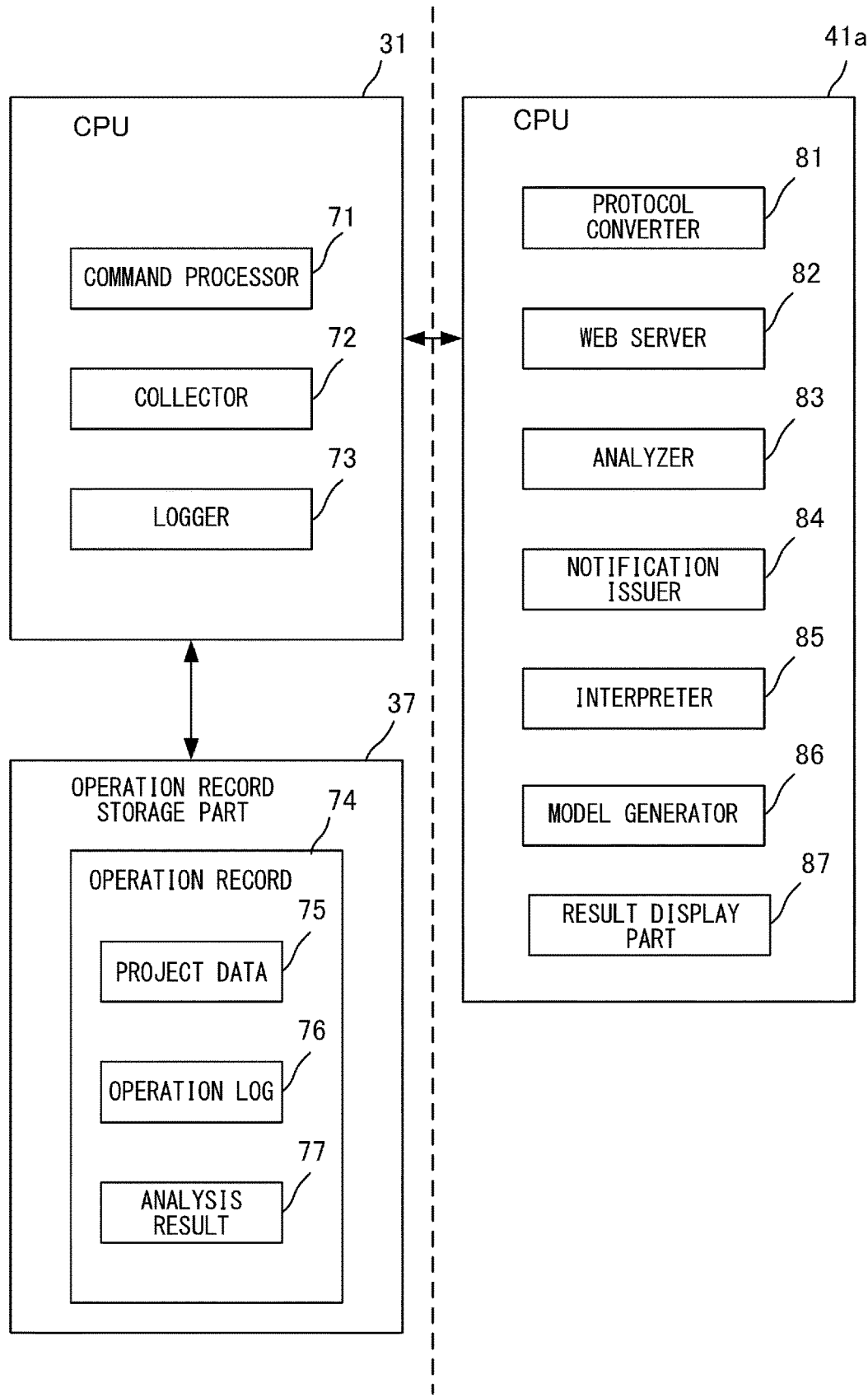
FIG. 6 is a diagram illustrating functions implemented by a CPU of the PLC.

FIG. 6 illustrates functions implemented by the CPU 31 and the CPU 41a executing control programs in the PLC 1. In the CPU 31, a command processor 71 interprets a command received from the PCs 2a and 2b, and executes processing corresponding to an interpretation result. For example, when a request signal created by encapsulating an HTTP request is received, the command processor 71 transfers the request signal to the CPU 41a. When a response signal to the request signal is received from the CPU 41a, the command processor 71 transfers the response signal to the PCs 2a and 2b. The command processor 71 may also be provided in the analysis unit 4a. In this case, a command from the PC 2a is processed by the command processor 71, and a command from the PC 2b is processed by the command processor provided in the analysis unit 4a. A collector 72 collects symbol values (values stored in the device value and variable) from the basic unit 3 and the expansion unit 4b and stores the symbol values in the ring buffer 36. A collection setting of the collector 72 can be performed from at least one of the basic unit 3 and the analysis unit 4a. A logger 73 determines whether any error or trouble (abnormal event) has occurred in the PLC 1 based on the collected symbol value and the like. For example, the logger 73 may determine whether the collected symbol value satisfies a recording condition. When the collected symbol value satisfies the recording condition, the logger 73 saves this symbol value as an operation log 76 in the operation record 74. The logger 73 also saves project data 75, executed when the operation record has been created, in the operation record 74. In addition, the logger 73 notifies an analyzer 83 that the operation record 74 has been created.

In the CPU 41a, a protocol converter 81 performs protocol conversion of the HTTP request encapsulated and transferred from the PC 2b and takes out the HTTP request from the request signal. The protocol converter 81 encapsulates response information transmitted from the web server 82 with respect to the HTTP request and passes the response information to the CPU 41a. The protocol converter 81 may provide a transparent tunnel (e.g., a TCP tunnel). The web server 82 provides the PC 2b with an analysis report created by the analyzer 83. The analyzer 83 analyzes the operation log 76 in the operation record 74 using a model to be described later, creates an analysis result 77, and passes the analysis result to the logger 73. When the analyzer 83 creates the analysis result 77, the logger 73 adds the analysis result 77 to the operation record 74 in addition to the project data 75 and the operation log 76. The operation record 74 is stored in the operation record storage part 37. Alternatively, the analysis result 77 may be stored in a memory 42a of the analysis unit 4a. When the analysis result 77 is issued, a notification issuer 84 issues a notification. This notification is transmitted to the CPU 1b.

For example, when the web browser 18 requests an analysis report by an HTTP request, the web server 82 passes the HTTP request to the protocol converter 81. The HTTP request includes a uniform resource locator (URL) of the analysis unit 4a (web server) that is executed by the CPU 41a and provides the analysis report. The protocol converter 81 encapsulates the HTTP request and converts the HTTP request into a request signal (command) that can be transmitted using a predetermined communication protocol. This request signal is passed to the CPU 41a of the analysis unit 4a. The CPU 41a returns the analysis report to the CPU 1b. The CPU 1b passes the analysis report to the web browser 18. As a result, the web browser 18 displays the analysis report on the display part 7b.

An interpreter 85 interprets information associated with the programmable logic controller (PLC) that can be acquired from the basic unit 3, and determines attribute information regarding each device. Details of the information associated with the PLC will be described later with reference to FIGS. 7 to 9. A model generator 86 generates a model serving as master data to be compared with the operation record data by the analyzer 83 later. The model is created by being added with the attribute information determined by the interpreter 85 for each device. A result display part 87 generates an analysis report which is a display screen for displaying the analysis result 77 on the web browser 18 of the PC 2b. Details of the analysis report will be described later with reference to FIG. 14.

<Information Associated with PLC>

Hereinafter, the information associated with the PLC, which is information unique to the PLC, will be described with reference to FIGS. 7 to 10. As will be described later, the information associated with the PLC includes various types of information. These pieces of information are unique to the PLC 1 that can be recognized from the user program executed by the PLC 1, a unit configuration of the PLC 1, and a communication configuration, and thus, the pieces of information associated with the PLC are also collectively referred to as PLC-specific information. The PLC-specific information includes, for example, various types of information such as unit configuration information, connection information and communication setting information of communication equipment, and interpretation information of the user program. In addition, the interpretation information of the user program further includes information different from a symbol value of a symbol, for example, information such as the number of times of device use, input device information, and device type information. According to the present embodiment, these pieces of PLC-specific information are utilized to suitably analyze symbols such as a device and a variable and suitably output analysis results. More specifically, the PLC-specific information is utilized to perform analysis by narrowing down symbol values of symbols, such as device values of all devices, to a predetermined attribute according to the PLC-specific information, and create an analysis report narrowed down to the predetermined attribute. The PLC-specific information may include a motion-related symbol, a motion setting, a communication setting, a communication partner/sensor type, event/error information, and camera-related information.

Figure 7:
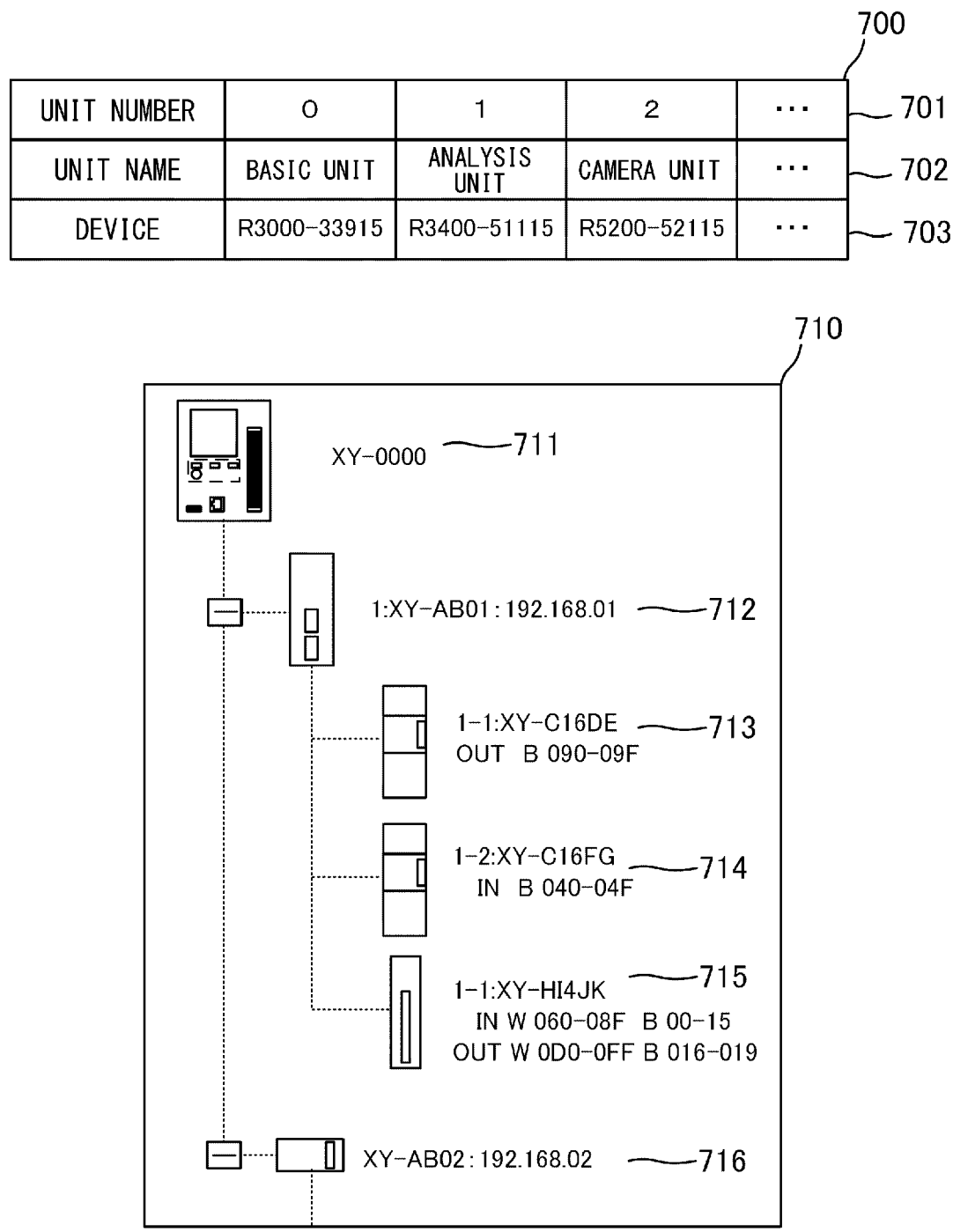
FIG. 7 is a diagram illustrating information associated with the PLC.

FIG. 7 is a diagram illustrating the unit configuration information and the connection information of the communication equipment. The unit configuration information of the PLC 1 is illustrated in 700. As described above, the PLC 1 includes the basic unit 3 and the one or more expansion units 4. The unit configuration information is information indicating configurations of all the units included in the PLC 1. As illustrated in 700, the unit configuration information includes at least a unit number 701, a unit name 702, and information 703 on a device allocated to each unit. For example, when information indicating any unit to which a predetermined device is allocated is added, the importance of the device at the time of analysis can be determined according to an attribute of the unit as an allocation destination. The attributes of units include various attributes such as a basic unit, an IO input unit, an analysis unit, a motion unit, a recorder unit, and a camera unit. For example, an external input device such as a sensor is allocated to the IO input unit, which is information that is an important analysis target when an abnormality occurs and enables a person who is not familiar with a ladder program to easily interpret a trouble factor. In addition, in the case of an analog input unit, it is possible to doubt an abnormality of a robot that monitors a connected current value and the like. In the case of a motion unit, information that can doubt an abnormality of a connected movable part is obtained. In this manner, it is possible to narrow down analysis targets and narrow down analysis results by utilizing the unit configuration information. Although the unit configuration information in a table format is illustrated here, there is no intention to limit the present invention, and the unit configuration information may be configured in another data format.

Connection information of communication peripheral equipment of the PLC 1 is denoted by 710. The connection information includes information indicating any communication slave that is associated with a device, and information indicating a communication setting. The connection information enables identification of a communication partner of the device, and enables efficient analysis of the device and narrowing down of analysis results. The connection information 710 illustrated in FIG. 7 includes pieces of connection information and communication setting information between units 711, 712, and 716 and devices 713 to 715 connected to the unit 712. For example, 715 denotes a sensor, and includes related information such as a communication setting, for example, a sensor signal determined by comparing a light reception amount with a threshold as bit information, and a set value and the light reception amount as word information. Since the sensor often fails, the priority of analyzing the sensor signal is high. In addition, the light reception amount indicates a state, and thus, has a high priority. In addition, an actuator is a portion that moves an apparatus and often fails, and thus, the priority of analyzing a device is allocated thereto is high. Note that the connection information may have any data format similarly to the unit configuration information.

FIG. 8 is a diagram illustrating an example of the interpretation information acquired by interpreting a ladder program which is the user program. An example of a function of displaying use statuses of devices of the PLC 1 is denoted by 800, a comment added to each of the devices by an operator is denoted by 810, and an input contact and an output contact of the device are denoted by 820.

A number-of-uses display 800 is a screen used by an engineering tool of the basic unit 3, which is the CPU unit, and includes display areas for a selection condition setting 801, a search setting 802, and a search result 803. The PLC 1 has a function of selecting a device or a program, performing search execution, and acquiring and displaying the number of uses and the number of non-use times of each of the devices. That is, the basic unit 3 holds information associated with the number of uses of each of the devices. The information associated with the number of uses of the device is useful for narrowing down analysis targets of the operation record data and narrowing down analysis results. For example, even if being not used in the ladder program, many devices are changed to be operated or to be operated in the basic unit 3 or the expansion unit 4. In addition, a device sometimes operates unintentionally. Such a device is generally a redundant device in many cases, and is sometimes unnecessarily detected when all the devices are compared, but has a low priority as an analysis target for the trouble factor. Therefore, such a device can be identified by the number of uses of the device, and can be utilized for narrowing down the analysis targets and narrowing down the analysis results. On the other hand, control may be performed such that a device having a large number of uses has a high priority as a target of analysis or the like.

In the device comment 810, 811 denotes a device number, and 812 denotes a comment input by the operator. As illustrated in FIG. 8, the operator generally adds a comment to a device to be used instead of adding comments to all the devices. Therefore, the device added with the comment can be determined to be an important device, and can be set to have a high priority as the target of analysis or the like. On the other hand, a device to which no comment is added can be set to have a low priority as the target of analysis or the like. In the example of FIG. 8, devices MR00 to MR03, MR07, and MR08 can be set to have a high priority as the targets of analysis or the like, and devices MR04 to MR06 can be set to have a low priority.

The input/output contact 820 indicates the presence or absence of an input contact and an output contact in each of the devices. A device number is denoted by 821, the input contact is denoted by 822, and the output contact is denoted by 823. The basic unit 3 can identify whether or not the device of interest is an input from the outside with reference to the input/output contacts of each of the devices by analyzing the ladder program. In the example of FIG. 8, a device having only the input contact and having no output contact such as a device LR300, is highly likely to be an external input from communication or I/O. As described above, the external input has a high priority as the target of analysis or the like, and such a device value can be useful information.

FIG. 9 is also a diagram illustrating an example of the interpretation information acquired by interpreting the ladder program which is the user program. Type information that can be associated with each of devices is denoted by 900, and a value in a case where the same device value is expressed by different type information is denoted by 910. Type information that can be associated with each of the devices is acquired by interpreting a command word of the ladder program. For example, a load command for reading a device value from a device designates a device of DM0 as an operand, and the command word is added with ".L" as a suffix as in "LDA.L", it is recognized that a type of the device DM0 is a two-word signed integer corresponding to ".L".

In 900, 901 denotes the type and 902 denotes the number of bits. The respective devices include a 0, 1-bit device, and a word device or a floating-point number device taking an analog value. Note that the word device further includes a 1-word unsigned integer (0 to 65535), a 1-word signed integer (−32768 to 32767), a 2-word unsigned integer (0 to 4294967295), and a 2-word signed integer (−214783648 to 214783647). The floating-point number type includes a 32-bit single-precision floating-point type and a 64-bit double-precision floating-point type. In this manner, device values of the respective devices may take various types.

In 910, 911 denotes a device number, 912 denotes a current value, and 913 denotes an expression format of the current value. In 910, the same current value is represented in a plurality of expression formats. As illustrated in 910, even the same value is interpreted as a different value for each type. In this manner, the meaning of data is completely different unless the device value is analyzed in consideration of the type, and there is a possibility that it is difficult to perform correct interpretation.

An example of the case of interpreting the ladder program in the user program has been described with reference to FIGS. 8 and 9. However, the present invention is not limited thereto, and a user program in another programming language may be interpreted and utilized for analysis or the like. For example, the user program includes various programs such as a script program, a flow program, a motion program, and graphical programming in addition to the ladder program. In particular, the script program and the flow program can achieve logic similar to that of the ladder program. Therefore, the interpretation information described with reference to FIGS. 8 and 9 can be acquired by interpreting at least the script program and the flow program.

<Basic Flow>

Figure 10:
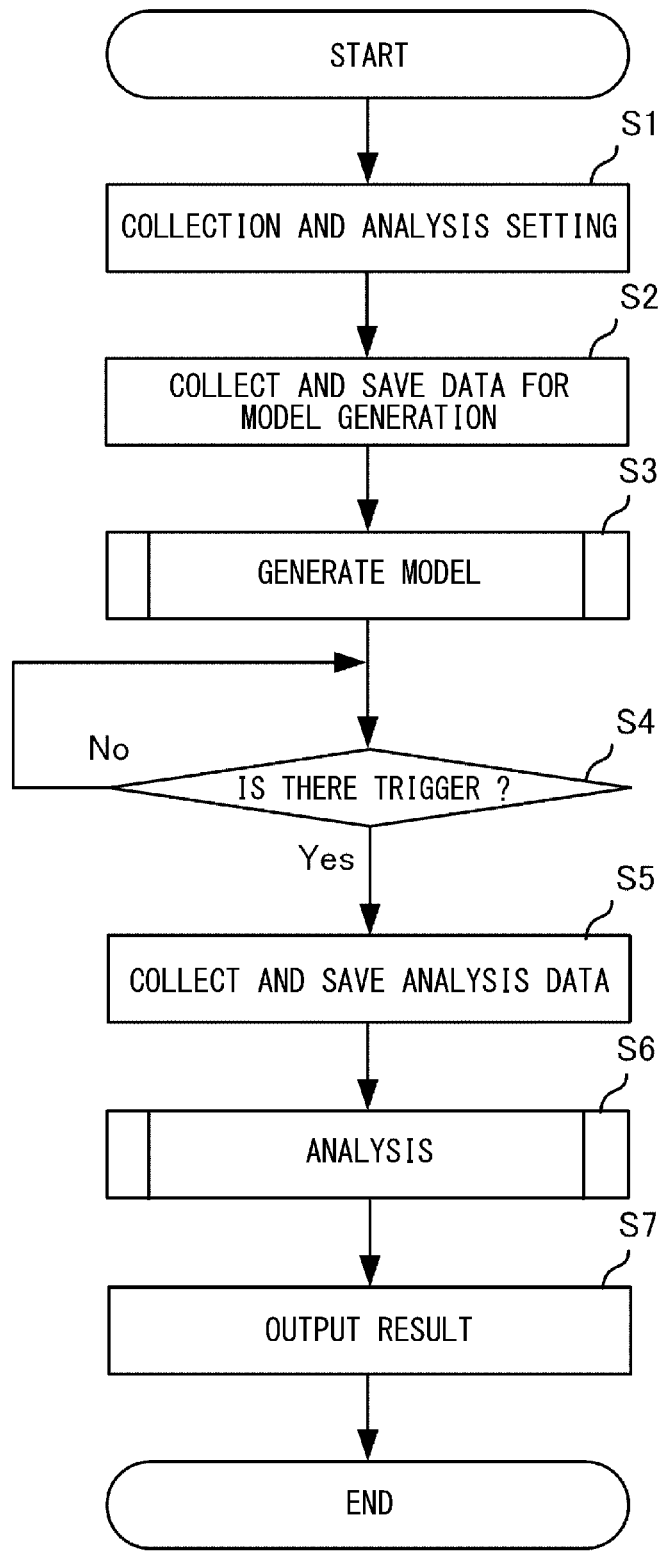
FIG. 10 is a flowchart illustrating a basic flow.

FIG. 10 illustrates a basic flow of model generation, analysis of operation record data, and result output according to the present embodiment. Processes to be described hereinafter will be described as processes to be executed by the CPU 31 of the basic unit 3 and the CPU 41a of the analysis unit (expansion unit) 4a. However, there is no intention to limit the present invention, and some of these processes may be executed by another unit, and all of the processes may be executed by one unit or may be executed by an external apparatus (analysis apparatus) connected to the programmable logic controller to be capable of communicating with each other.

In S1, the CPU 31 of the basic unit 3 sets a collection setting and an analysis setting in the collector 72 according to information input via the PC 2a. For example, the CPU 31 can set a collection target, a collection period, a saving destination, a file name, and the like as the collection setting. The analysis setting includes, for example, settings of a start and an end of a cycle to be analyzed. Here, an example in which the basic unit 3 performs the collection setting and the analysis setting has been described, but the CPU 41a of the analysis unit 4a may perform the collection setting according to information input via the PC 2b. In addition, in S1, the CPU 31 of the basic unit 3 can set, as the analysis setting, a camera setting such as a photographing condition, an image processing setting, a monitoring item setting, and the like according to the information input through setting screens displayed on the display parts 7a and 7b of the PCs 2a and 2b. Note that these analysis settings can also be executed by the CPU 41a of the analysis unit 4a. Thereafter, in S2, the CPU 31 collects operation record data as data for model generation according to the collection setting set in S1, and stores the operation record data in the operation record storage part 37. More specifically, all device values collected in accordance with the collection setting are temporarily stored in the ring buffer 36, and necessary data from the ring buffer 36 is stored in the operation record storage part 37 as the operation record data.

Next, in S3, the CPU 41a of the analysis unit 4a generates a model using the collected operation record data. The model may include information for each device obtained by classifying patterns of the respective devices based on a characteristic amount such as a constant, a bit pattern, and an analog value, and information indicating a timing at which the device value changes. That is, a change pattern in a normal state of each of the devices is learned in the model. Detailed processing of S3 will be described later with reference to FIG. 11.

Thereafter, in S4, the CPU 31 of the basic unit 3 determines whether a trigger for analyzing the operation record data has been generated. Regarding the trigger, basically a case where an abnormality different from usual occurs during the operation is set as the trigger, and establishment conditions thereof include, for example, a case where an error bit is set, occurrence of a predetermined event from an application, such as a monitoring application, reception of a manual instruction from an operator, and the like. When the trigger is generated, the processing proceeds to S5.

In S5, the CPU 31 of the basic unit 3 stores operation record data, obtained by collecting the respective device values for analysis, in the operation record storage part 37. In general, the trigger is generated after occurrence of a certain change different from usual. Therefore, here, data before and after the trigger is acquired to identify a factor of such a change. As described above, the device values of all the devices during the operation are held in the ring buffer 36. Therefore, when determining that the trigger has been generated, the CPU 31 stores necessary device values before and after the trigger from the ring buffer 36 into the operation record storage part 37 according to the analysis setting set in S1.

Thereafter, in S6, the CPU 41a of the analysis unit 4a acquires time-series data collected by the basic unit 3, and executes analysis processing in comparison with the model generated in S2. Details of S6 will be described later with reference to FIG. 12. In addition, in S7, the CPU 41a generates display data indicating a result based on an analysis result, transmits the generated display data to the PC 2b or an external apparatus via the communication part 43, and ends the processing. For example, the analysis result is displayed to the operator in the PC 2b. Note that detailed processing in the PC 2b will be described with reference to FIG. 13. In addition, details of a result display screen will be described later with reference to FIG. 14.

The monitoring application is one of data utilization applications executed by the CPU 41a of the analysis unit 4a. The analysis unit 4a may be an expansion unit that executes the data utilization applications. The data utilization applications include a data utilization program (e.g., flow) that collects control data and performs data processing, and a dashboard that displays an execution result of the data utilization program. As the data utilization application, there may be a monitoring application that monitors a device or a variable, which is a monitoring target, in real time, an operation record analysis application that analyzes an operation record for reproducing an operation state of the PLC 1 and generates an analysis report, and the like. In addition, there may be a calculation application that calculates a key performance indicator (KPI), such as a utilization rate, a non-defective product rate, and a cycle time, and the like as the data utilization application. The monitoring application is an application configured for constant monitoring based on symbol values of symbols of the PLC 1, and is, for example, an application that constantly collects symbol values of one or a plurality of symbols at a scan time level according to a setting of the monitoring application and constantly displays information based on the collected symbol values while updating the information in real time. The one or plurality of symbols to be constantly monitored are set in advance by a user. The monitoring application has, for example, a web server function, and can be set from a general-purpose browser via the communication part 43. Since the setting can be performed from the general-purpose browser, the setting or monitoring can be performed from a PC, a smartphone, or a tablet without using a dedicated tool such as a programming support apparatus. In addition, for the one or plurality of symbols to be constantly monitored, the monitoring application automatically sets a threshold corresponding to the symbols based on symbol values in a plurality of cycles in the normal state. For example, the monitoring application receives a user instruction, and automatically sets a threshold for monitoring states of a plurality of symbols to be constantly monitored, for the symbols, based on variations in the symbol values in the plurality of cycles in the normal state. The threshold is set to monitor a state different from usual, that is, an abnormal state, and the monitoring application issues an alarm when the symbol values of the monitoring target symbols exceed the threshold. In this manner, for example, the PLC 1 can catch a sign before a facility is shut down. The PLC 1 may set the alarm when the symbol values of the monitoring target symbols exceed the threshold as a result of the sign monitoring performed by the monitoring application as a condition for saving an operation record. The PLC 1 saves operation record data before and after the trigger with the occurrence of the alarm by the monitoring application as an event trigger. When the saving of the operation record data is completed, the PLC 1 turns on a saving-completed device. The operation record analysis application may automatically analyze the operation record data when receiving the completion of saving of the operation record data. For example, the operation record analysis application may analyze the operation record data in response to turning on the saving-completed device. The operation record analysis application analyzes symbol values (e.g., device values of all bit devices) of symbols to be analyzed, and extracts a symbol of a factor candidate causing an alert. In this manner, the operation record analysis application automatically analyzes the factor of the occurrence of the alarm by the monitoring application from the operation record data saved due to the occurrence of the alarm, and extracts a symbol different from usual from the operation record data. As a result, the CPU 41a constantly monitors the state of the facility by a sign monitoring function of the monitoring application, and issues the alert due to a change factor. Further, the CPU 41a automatically analyzes the alert factor and extracts the symbol different from usual. That is, the PLC 1 monitors the sign of the facility to be controlled by constantly monitoring the symbol value, notifies the sign through the alarm before the facility to be controlled is stopped, and automatically analyzes the factor of the sign.

<Model Generation Flow>

Figure 11:
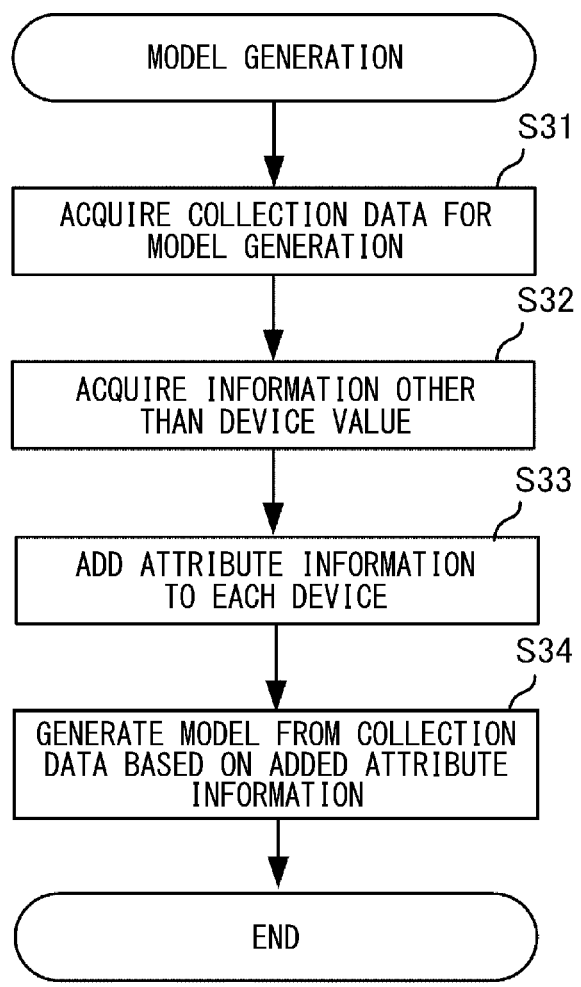
FIG. 11 is a flowchart illustrating a model generation flow.

FIG. 11 illustrates details of the above model generation process in S3 according to the present embodiment. Processes to be described hereinafter will be described as processes to be executed by the CPU 41a of the analysis unit (expansion unit) 4a. However, there is no intention to limit the present invention, and some of these processes may be executed by another unit, and all of the processes may be executed by one unit or may be executed by an external apparatus (analysis apparatus) connected to the programmable logic controller to be capable of communicating with each other.

First, in S31, the CPU 41a of the analysis unit 4a acquires operation record data in the normal state for model generation from the basic unit 3. The operation record data is data stored in the operation record storage part 37 in S2 described above. State information, such as "normally operating", "in error", and "being stopped, may be acquired from the basic unit 3, and a symbol value of "normally operating" may be acquired. As a result, data in the normal state can be automatically acquired. The state information may be acquired from a symbol value of a symbol indicating the state information. Subsequently, in S32, the CPU 41a acquires information other than the device value. The information other than the device value acquired here includes information unique to the basic unit 3 and related to the above-described programmable logic controller. The information is information held in the basic unit 3 and is periodically updated. In addition, the information acquired here may also include information acquired by the field device 10 such as a camera connected to the expansion unit 4b, for example, camera image data and the like. These pieces of data may be acquired via the basic unit 3, but may be directly acquired from, for example, the expansion unit 4b and the like.

Next, in S33, the CPU 41a analyzes the information other than the device value acquired in S32 and adds attribute information to each of the devices. Note that the information acquired in S32 may have a format of interpretation information that has been already analyzed by the basic unit 3. In this case, the CPU 41*a* identifies and adds the attribute information of each of the devices according to the interpretation information. In addition, the attribute information is information indicating any unit to which the device is connected, whether the device is an input device, or a word type (16 bits or 32 bits, signed or unsigned, an integer or a floating-point number, or the like). These pieces of attribute information are information used to determine the priority of the device to be analyzed in an analysis flow to be described later, and used to interpret the device value at the time of analysis. That is, according to the present embodiment, these pieces of attribute information, obtained by analyzing the information associated with the programmable logic controller, are used for narrowing down in the analysis or the like, or used to suitably perform the analysis processing or analysis result display.

Next, in S34, the CPU 41*a* generates a model from the operation record data acquired in S31 based on the added attribute information, and ends the processing. The generated model is master data used at the time of analysis, and may include information for each of the devices obtained by classifying patterns of the respective devices based on a characteristic amount such as a constant, a bit pattern, and an analog value, and information indicating a timing at which the device value changes as described above.

<Analysis Flow>

Figure 12:
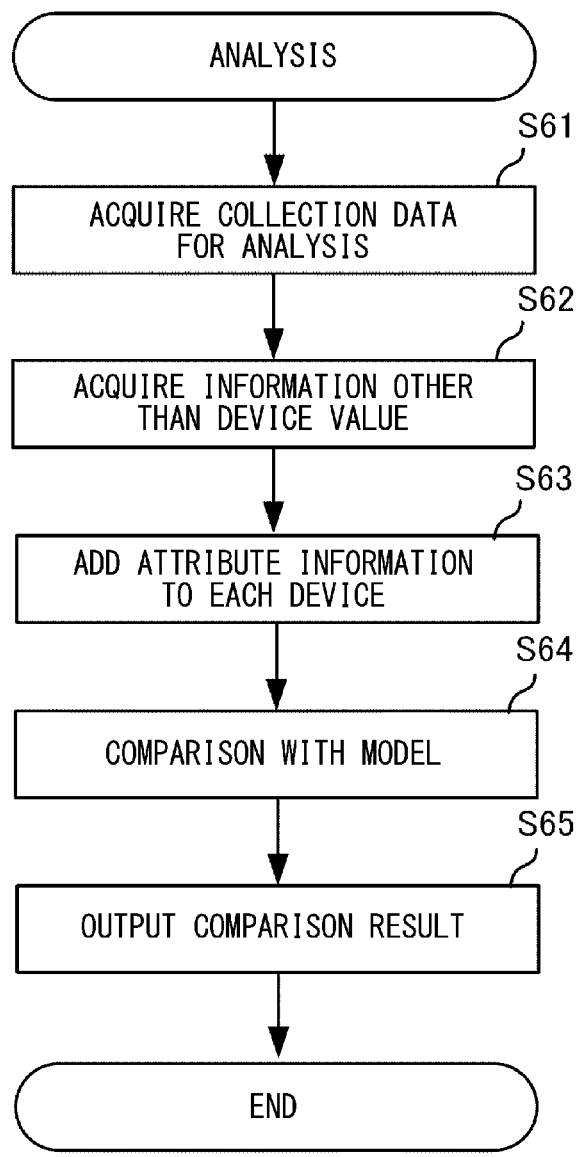
FIG. 12 is a flowchart illustrating an analysis flow.

FIG. 12 illustrates details of the analysis processing in S6 according to the present embodiment. Processes to be described hereinafter will be described as processes to be executed by the CPU 41*a* of the analysis unit (expansion unit) 4*a*. However, there is no intention to limit the present invention, and some of these processes may be executed by another unit, and all of the processes may be executed by one unit or may be executed by an external apparatus (analysis apparatus) connected to the programmable logic controller to be capable of communicating with each other.

First, in S61, the CPU 41*a* of the analysis unit 4*a* acquires operation record data for analysis from the basic unit 3. Here, camera image data and information of an event occurrence history and an error history are also acquired in addition to the operation record data. Thereafter, the similar processes as in S32 and S33 described above may be executed in S62 and S63. As a result, the latest attribute information can be added to the device. Note that the processes in S62 and S63 may be omitted, and the processing may proceed to S64.

In S64, the CPU 41*a* compares the time-series operation record data acquired in S61 with the model generated in S34 of the corresponding device. For example, time-series device values are compared with values of the time-series master data thus generated to acquire a difference. If there is a difference equal to or more than a predetermined value, it is determined that a state different from usual is detected. Subsequently, in S65, the CPU 41*a* outputs an analysis result according to the comparison result in S64, and ends the processing. Thereafter, in S7, the PC 2*b* generates and outputs a result display screen indicating the analysis result.

<Result Display Flow>

Figure 13:
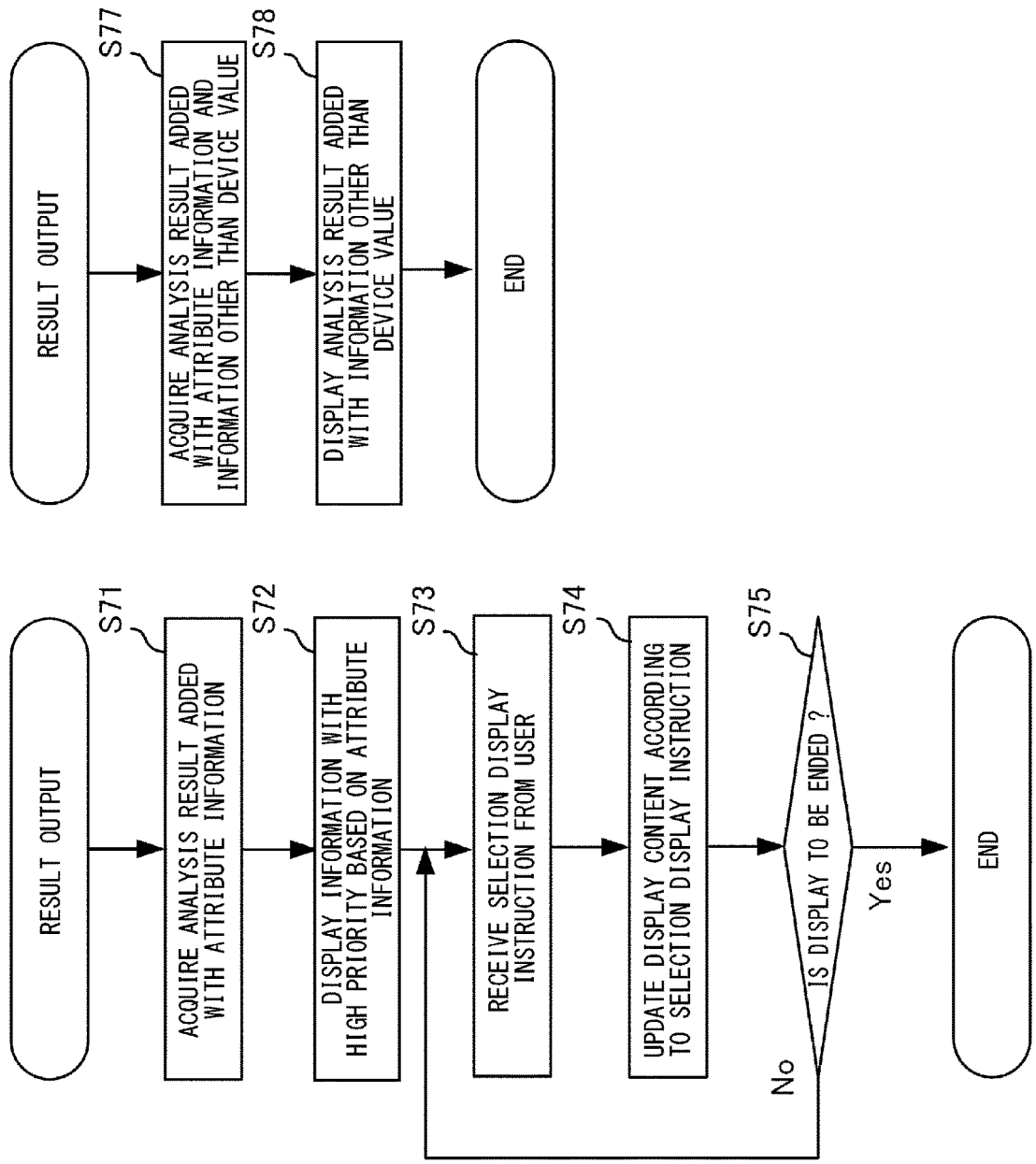
FIG. 13 is a flowchart illustrating a display flow of an analysis result.

FIG. 13 illustrates details of a result display flow according to the present embodiment. Processes to be described hereinafter will be described as processes to be executed by the CPU 1*b* of the PC 2*b*. However, there is no intention to limit the present invention, and some of these processes may be executed by a unit of the PLC or may be executed by another external apparatus (the PC 2*a* or the like) connected to the programmable logic controller to be capable of communicating with each other. In the case of being executed by a unit of the PLC, a monitor is provided in the unit. A flowchart 1300 illustrates a result display flow for performing control to narrow down devices in an analysis result to be displayed according to the attribute information acquired from the basic unit 3. On the other hand, a flowchart 1310 illustrates a result display flow in which an analysis result is added with the attribute information acquired from the basic unit 3 and displayed.

First, the flowchart of 1300 will be described. In S71, the CPU 1*b* of the PC 2*b* receives the analysis result added with the attribute information and the information associated with the programmable logic controller from the analysis unit 4*a* via the communication cable 9*b*. Subsequently, in S72, the CPU 1*b* displays an analysis report narrowed down to information with a high priority based on the attribute information on the display part 7*b* as the result display screen. Basically, a device for which a state different from usual has been detected is preferentially displayed in the result display screen. However, when such a state different from usual is detected from a large number of devices, information narrowed down using the attribute information is displayed. Note that all the corresponding devices may be displayed using a scroll button or the like, but even in this case, it is desirable that an analysis result of a device displayed on the screen first be a device with a high priority. As a result, the operator can more efficiently identify an abnormal site and a factor of the abnormality. In addition, it is possible to support the operator who does not have specialized knowledge in identifying the abnormal site and the factor of the abnormality.

Thereafter, when receiving a selection display instruction on the result display screen as a user input via the operation part 8*b* in S73, the CPU 1*b* updates a display content according to the selection display instruction in S74. Subsequently, in S75, the CPU 1*b* determines whether the end of the result display screen has been selected, and returns the processing to S73 when an end instruction is not received, and ends the processing when the end instruction is received.

Next, the flowchart of 1310 will be described. In S77, the CPU 1*b* of the PC 2*b* receives the analysis result added with the attribute information and the information associated with the programmable logic controller from the analysis unit 4*a* via the communication cable 9*b*. Subsequently, in S78, the CPU 1*b* displays a result display screen obtained by adding information other than the device value to the analysis result on the display part 7*b*, and ends the processing. For example, the analysis result may be added with a device comment acquired as the PLC-specific information and displayed, or the analysis result may be added with information of a unit or communication equipment to which the corresponding device is connected or type information of the device and displayed. In addition, a camera image acquired from the basic unit 3 may be displayed together.

In the above flowcharts 1300 and 1310, the case where the PLC-specific information (e.g., attribute information) is used to narrow down the display of the analysis result at the time of displaying the analysis result, and the case where the PLC-specific information (e.g., camera image) is displayed together with the analysis result have been separately described. However, the present invention is not limited thereto, and control may be performed such that both types of control are performed together.

<Result Display Screen (Analysis Report)>

Figure 14:
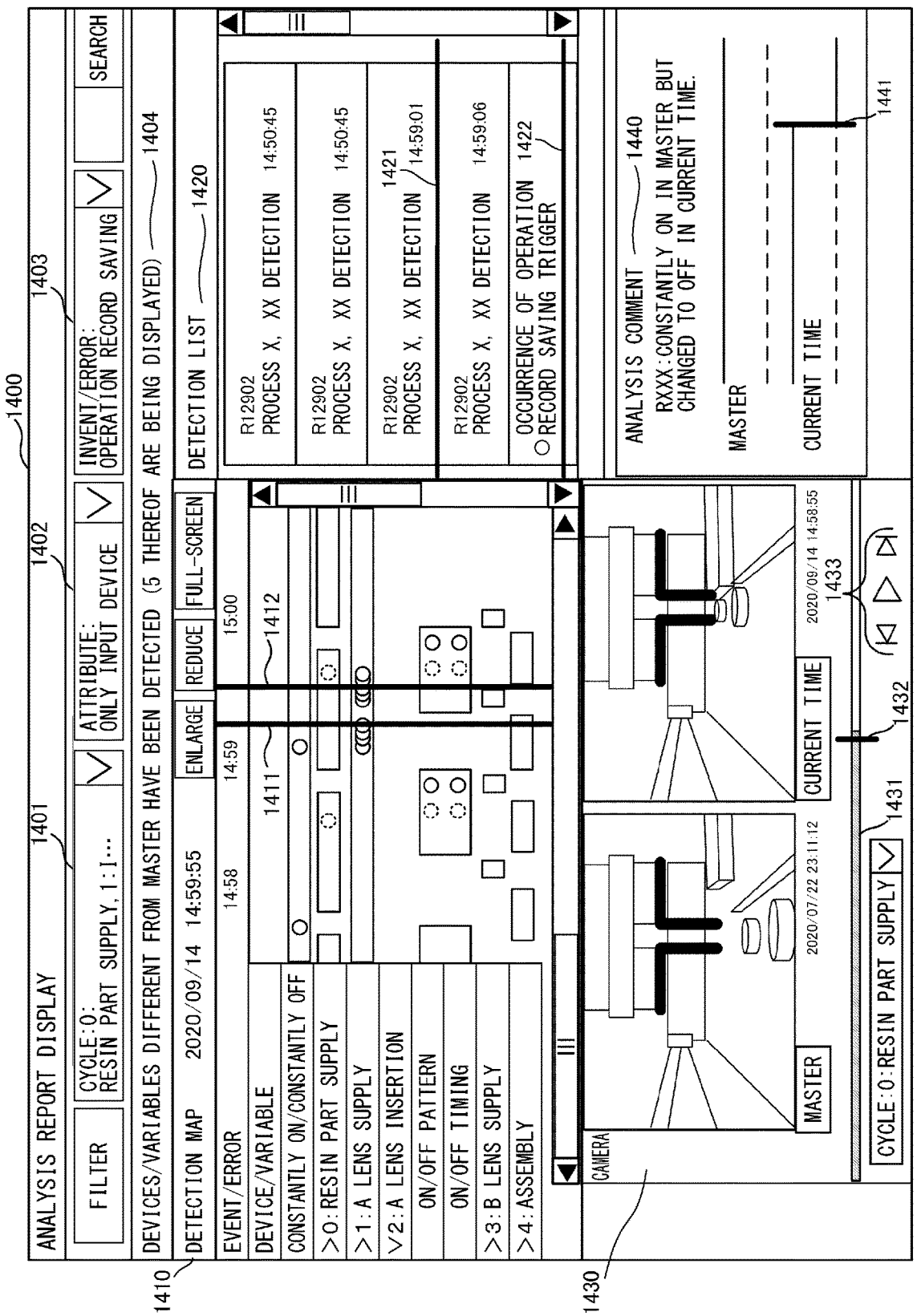
FIG. 14 is a diagram illustrating a result display screen.

FIG. 14 illustrates a result display screen displayed on the display part 7b when the web browser 18 according to the present embodiment executes the web browser program 14d. Although an example in which a result display screen 1400 is displayed on the display part 7b of the PC 2b is described here, there is no intention to limit the present invention. Such display may be performed on display parts of other apparatuses, or may be performed on a monitor included in the expansion unit of the PLC as long as the monitor can perform such display. For example, the other apparatuses may include a programmable display, a tablet, and a smartphone. Alternatively, an analysis report including a content of the result display screen to be described below may be transmitted to other apparatuses by e-mail, SNS, FTP transfer, or the like. An arbitrary comment may be added to the analysis report, for example, a handwritten character or an input character comment may be added to the analysis report. In this case, the analysis report including the content of the result display screen added with the arbitrary comment may be transmitted to other apparatuses. As a result, a recipient of a mail can view a field status such as the comment and the analysis report together. In addition, when the analysis report is transmitted to other apparatuses, operation record data as an analysis target of the analysis report may be transmitted in association with the analysis report. As a result, the recipient of the mail can view the operation record and the analysis report together. Further, if the PC 2b is a tablet, a smartphone, or the like equipped with a camera, a photograph of an apparatus may be attached together.

The result display screen 1400 includes filters 1401 to 1403 configured to filter a result for display, a filtered result 1404, a detection map 1410, a detection list 1420, a camera video 1430, and an analysis comment 1440. Note that at least one of 1410, 1420, 1430, and 1440 may be displayed as the result display.

The filter 1401 can select an operating cycle to filter the result display. The operating cycle herein refers to a period from a start timing to an end timing accompanied by a periodic change of a device value. If the filter 1401 is designated, a result is displayed only for an analysis result of a device operating in the selected operating cycle.

The filter 1402 can select attribute information to filter the result display. As described above, the attribute information refers to the information indicating any connected unit or communication equipment or the information indicating whether the corresponding device is the input device. For example, if "unit configuration information" is designated in the filter 1402, configurations of units are displayed, and any one of the displayed units can be selected. If a unit is selected, a result is displayed only for a device connected to the unit. In addition, if "input device" is designated as the attribute information, a result is displayed only for a device added with the attribute information of the input device. The filter 1402 is not limited to the filtering that utilizes the attribute information. For example, there is a case where the same symbol is detected redundantly as an abnormal symbol as a result of analysis. There is a high possibility that the earliest occurrence time is important in searching for the factor of the abnormality, and the filter 1402 may filter the same symbols detected redundantly to obtain those corresponding to the earliest occurrence time. In addition, the filter 1402 may filter symbols having the same detection algorithm at the time of analysis to obtain those corresponding to the earliest occurrence time. Further, the filter 1402 may filter symbols having the same detection algorithm at the time of analysis and the same cycle setting, which will be described later, to obtain those corresponding to the earliest occurrence time.

The filter 1403 can select an event or an error to filter the result display. If the type of the event or error is designated, a result is displayed only for an analysis result of a relevant device. For example, when "operation record saving trigger" is selected as the event, a result is displayed only for analysis results before and after the event. The result display screen 1400 may display the event or the error together with the analysis result in order of the occurrence time. In this case, the filter 1403 can filter the event or error. As a result, it is possible to switch between the display in which the analysis result is mixed with the event or error and the display of the analysis result. Here, examples of the event include power ON/OFF, rewriting of a device value, insertion/removal of a memory, and the like, and a filtering target may be added or removed per category. Examples of the error include a communication error, a PLC operation error, a scan time excess error, and the like, and a filtering target may be added or removed per severity of the error.

Note that a filter condition in the filter 1401 to 1403 is determined as a logical product, and the corresponding analysis result is displayed. Therefore, the filter 1401 to 1403 are not necessarily selected, and the analysis result may be filtered when a filter desired by the operator is selected. Alternatively, the analysis result may be displayed by selecting a filter by default before being designated by the operator. Devices displayed as the above analysis results are devices for which states different from usual have been detected. The state different from usual means, for example, that a device value deviates from a normal range, or that a timing at which the device value changes or the number of times of the change deviates from a normal range. In a product manufacturing factory, the same product is mass-produced every day. That is, the same process is repeatedly executed many times. Therefore, to detect and display the state different from usual is very advantageous for improving the ladder program or reviewing a production facility. The normal range (normal state) defining the same state (normal condition) as usual may be defined by a user or may be defined by a learning result of the device value.

The detection map 1410 displays a cycle including a start timing and an end timing for each of a plurality of processes executed in the PLC 1. In the detection map 1410, a rectangle extending in the lateral direction indicates a period (cycle) during which the process is being executed. In addition, a circle in the rectangle indicates an abnormality occurrence site where a state different from usual has occurred in the cycle. In the detection map 111, among the rectangle indicating the processes, a left one is old, and a right one is new. A time bar 1411 indicates the currently selected time. A time bar 1412 indicates a timing at which an operation record data saving trigger has been generated. As described above, since data before and after the generation of the saving trigger is recorded regarding the operation record data, the data is shown before and after the time bar 1412.

An image display area 1430 displays a camera image acquired in the PLC 1. In FIG. 14, a camera image of master data and a camera image of the current time are displayed in a comparable manner. Since the camera image is also time-series data, a seek bar 1431 indicates reproduction time of the camera image and moves from left to right as the reproduction time elapses. A time bar 1432 indicates a timing at which a detection target device is turned into a state different from usual. A time designator 1433 is a control object configured to give an instruction to advance the reproduction time of the camera image, return the reproduction time, instruct a reproduction start, or stop the reproduction. Note that the reproduction time in the detection map 1410, the reproduction time of the camera image, and the reproduction time in a detection list 1420 are managed and displayed so as to be synchronized with each other on the result display screen 1400.

The detection list 1420 shows a device that has been turned into a state different from usual and the time at which the state has occurred (collection time of a device value). The detection list 1420 is a list showing the devices that have been turned into the states different from usual in chronological order. When detecting a click on a device displayed in the detection list 1420, the CPU lib can synchronize the displays of the detection map 1410, the detection list 1420, and the image display area 1430 based on identification information of the clicked device and reproduction time information (collection time of the device value). A time bar 1421 indicates the currently selected time, and indicates the same timing in conjunction with the time bars 1411 and 1431. A time bar 1422 indicates a timing at which the operation record data saving trigger has been generated.

An analysis comment 1440 displays a comment included in an analysis result, master data for the device selected in the detection list 1420, and time-series data of the current device value. A time bar 1441 indicates a timing at which the state different from usual has occurred, and indicates the same timing in conjunction with the time bars 1411, 1421, and 1431. The displayed comment indicates a content of an abnormality of the device.

Figure 15:
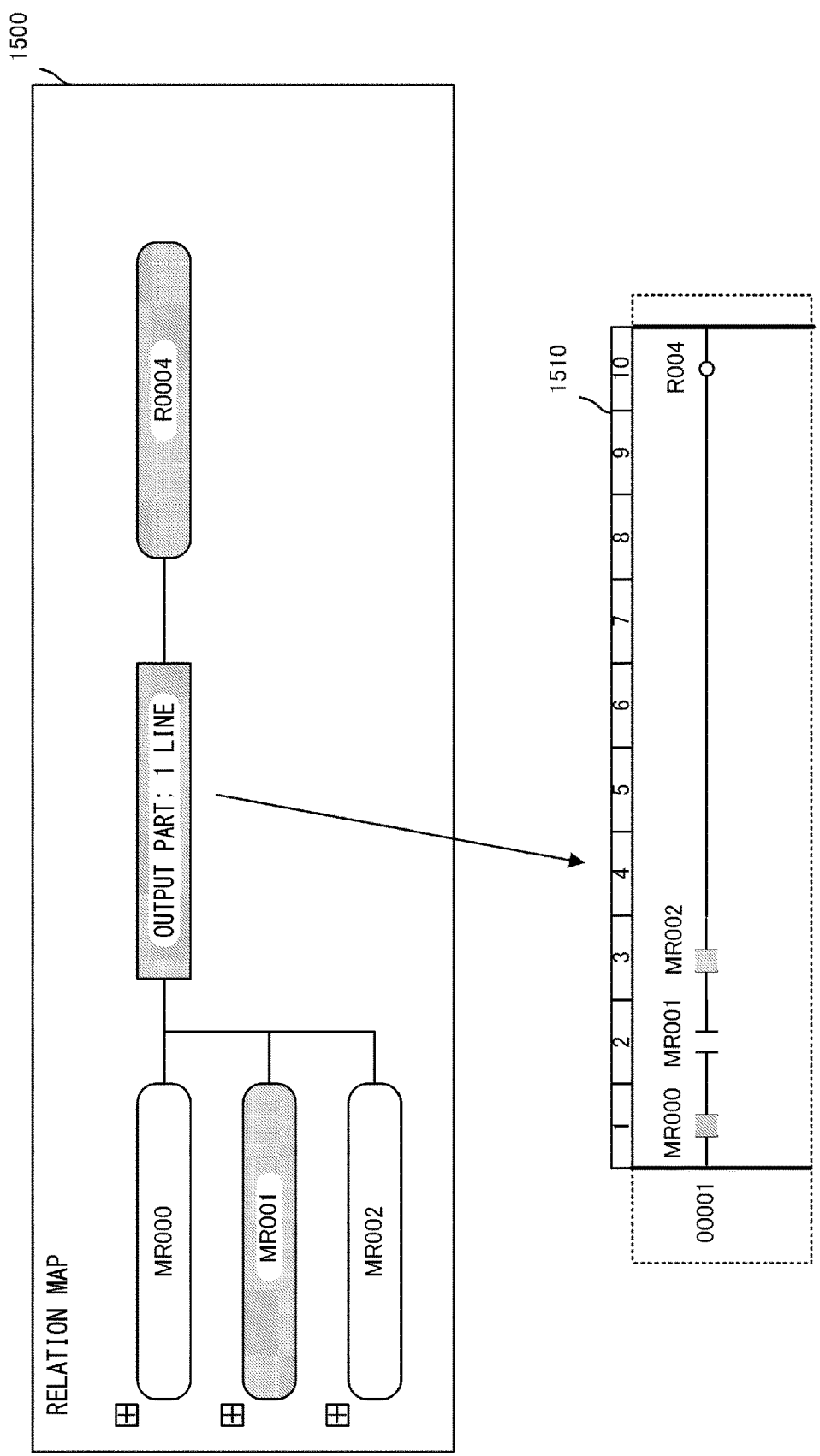
FIG. 15 is a diagram illustrating a relation map.

In this manner, the result display screen 1400 includes the displays of the plurality of analysis results such as the detection map 1410, the detection list 1420, the image display area 1430, and the analysis comment 1440. However, these result displays are examples, and other result displays may be additionally or alternatively included. For example, as illustrated in FIG. 15, dependency information (a relation map) between devices may be displayed as an analysis result. The basic unit 3 can grasp a dependency relation between devices or variables by analyzing the ladder program. For example, when a certain detected device is detected, it is possible to present dependent devices to the operator, such as to display devices related thereto side by side. As a result, it is possible to support the operator in grasping and identifying an abnormality.

FIG. 15 illustrates a relation map 1500. The relation map 1500 is a schematic display showing a relation between a program module related to a specific symbol and another symbol related to the program module in the user program such as the ladder program, and is a UI that displays another apparatus related to a device (abnormal device) via the program module in the ladder program when the abnormal device that is used in the ladder program and is turned into a state different from usual is selected as a specific symbol. This UI may be a screen that transitions by operating a display button (not illustrated) on the result display screen 1400, or may be additionally displayed on the result display screen 1400. Since the relation map is displayed, the user can easily understand the dependency relation between the abnormal device and the another apparatus. In general, the number of devices used in the PLC 1 is several hundreds to several tens of thousands, and thus, it is not easy for the user to identify a device serving as a factor that has caused unusual state of devices. The CPU 11 searches the ladder program for the abnormal device, finds a description related to the abnormal device, and analyzes the description to identify related devices. In this example, the abnormal device (e.g., R0004) is described in an output part in the ladder program, and MR000, MR001, and MR002 are present as the related devices. The CPU 11 displays the abnormal device and the related devices, identified from the ladder program, and the program module like a tree. In this example, a device input for the operation in the output part is displayed on the left side, a program module is displayed in the middle, and an abnormal device is displayed on the right side. As illustrated in FIG. 15, when a program module on the relation map 1500 is selected, the CPU lib may display the corresponding program module in a program display area 1510.

The CPU 11 identifies a program module related to a symbol from the user program according to the user's designation for identifying the symbol, identifies another symbol related to the identified program module, and generates the relation map 1500. The CPU 11 highlights an abnormal device included in the relation map 1500 based on an analysis result. The analysis result also includes the time when the abnormal device has been determined to be different from usual, and the CPU 11 may highlight only the abnormal device generated before the reproduction time on the relation map 1500. As a result, the abnormal device is kept highlighted since the occurrence of the state different from usual. In addition, the analysis result may include information indicating that a symbol not to be analyzed among symbols. In this case, the CPU 11 displays the symbol not to be analyzed and the other symbols to be distinguished from each other in colors or the like on the relation map 1500 based on the analysis result. As a result, it is possible to distinguish whether it has been determined not to be abnormal through analysis or it has not been determined to be abnormal because analysis has not been performed. Examples of the symbol not to be analyzed include a symbol in which a change pattern of a symbol value does not have regularity with respect to a control cycle or a cycle defined by the cycle definition and a symbol designated as the symbol not to be analyzed by a user.

MODIFICATIONS

The present invention is not limited to the above embodiment, and various modifications can be made. Hereinafter, various modifications will be described with reference to the drawings.

<Model Generation Flow Based on Cycle>

Figure 16:
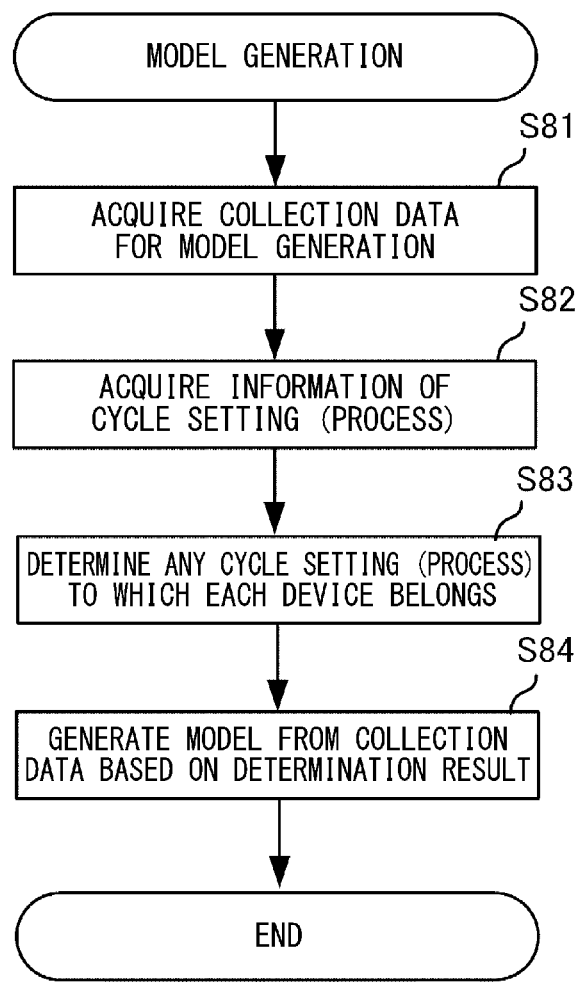
FIG. 16 is a flowchart illustrating a modification of the model generation flow.

FIG. 16 illustrates details of a model generation flow based on a cycle. This flowchart is a processing procedure illustrating an example of the model generation flow described with reference to FIG. 11. Here, control for determining an operating cycle of a device as attribute information of the device and generating a model will be described. As will be described hereinafter, the analysis unit 4a automatically extracts devices or variables belonging to processes (cycles) even from a plurality of pieces of data of non-synchronized processes (cycles). As a result, it is possible to omit extremely troublesome work in which an operator manually associates the processes (cycles) with devices in advance. Processes to be described hereinafter will be described as processes to be executed by the CPU 41a of the analysis unit (expansion unit) 4a. However, there is no intention to limit the present invention, and some of these processes may be executed by another unit, and all of the processes may be executed by one unit or may be executed by an external apparatus (analysis apparatus) connected to the programmable logic controller to be capable of communicating with each other.

First, in S81, the CPU 41a of the analysis unit 4a acquires operation record data in the normal state for model generation from the basic unit 3. The operation record data is data stored in the operation record storage part 37 in S2 described above. Subsequently, in S82, the CPU 41a acquires cycle setting information from the basic unit 3 as information other than a device value. The cycle setting information indicates, for example, information defining a cycle set by the operator via the PC 2a. The information defining the cycle may be information defining a reference timing of each cycle. For example, a symbol for defining the reference timing may be set. More specifically, the reference timing is designated by a symbol name and rising/falling edge information. The reference timing may be not only a timing indicating a start of a cycle but also a timing indicating an operation start in the cycle or a timing indicating an end of the cycle. In addition, the information acquired here may also include information acquired by the field device 10 such as a camera connected to the expansion unit 4b, for example, camera image data and the like. These pieces of data may be acquired via the basic unit 3, but may be directly acquired from, for example, the expansion unit 4b and the like. The cycle setting is sometimes defined in another application, and may be acquired from such a setting. In addition, the cycle setting may be provided to the PLC 1 in a file format such as CSV, and the PLC 1 may read the file such as CSV to perform the cycle setting.

Figure 17:
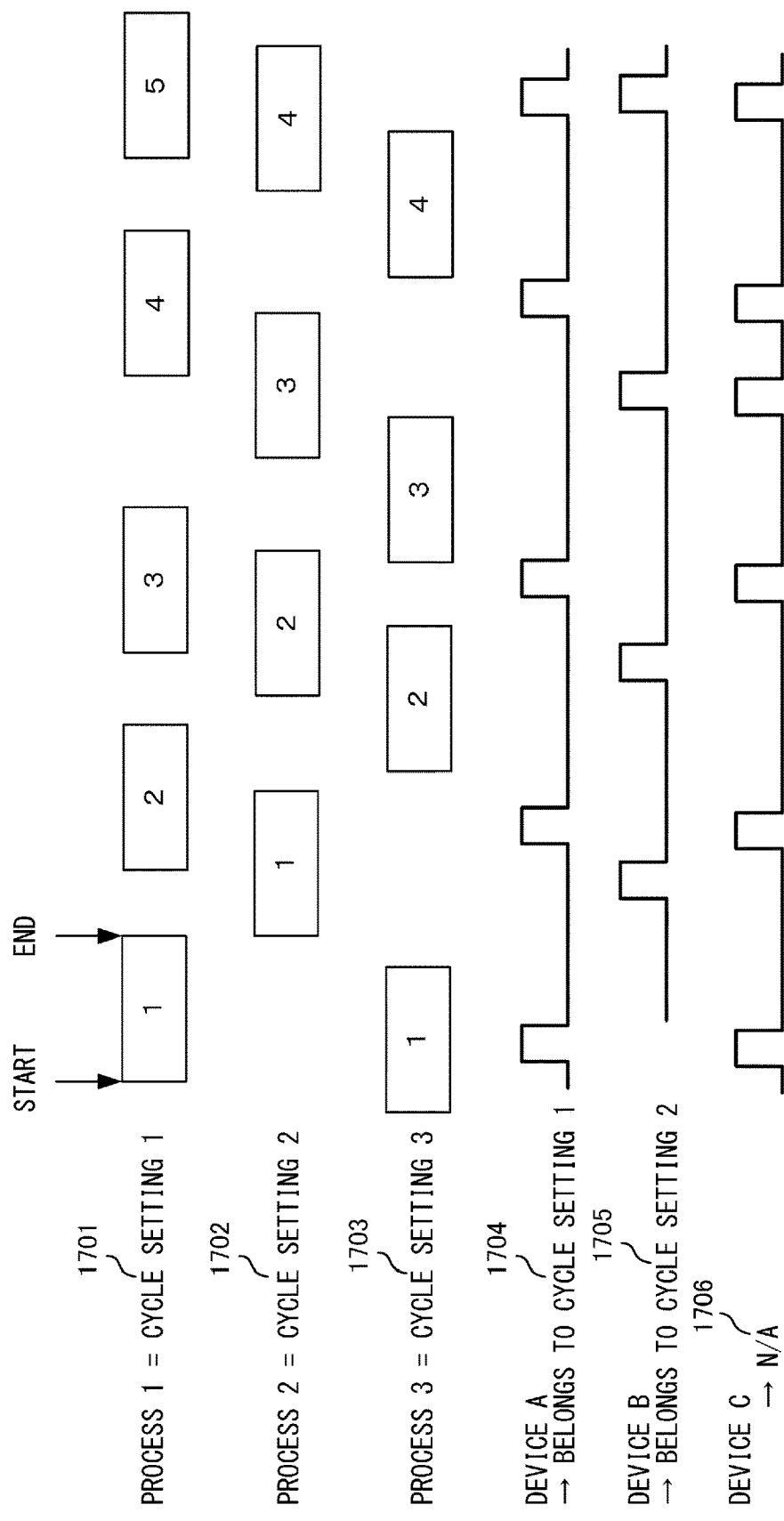
FIG. 17 is a diagram illustrating control for determining a cycle pattern.

Next, in S83, the CPU 41a determines any cycle to which each device belongs based on the cycle setting acquired in S32. There are various patterns as cycle patterns of the respective devices, and here, it is determined any pattern designated in the cycle setting to which each device belongs to. FIG. 17 illustrates control for determining the cycle pattern of each of the devices. In FIG. 17, a rectangle indicates a period (cycle) from a start timing to an end timing during which a process is being executed, and one rectangle indicates one cycle. The cycle pattern is a pattern in which one cycle appears. Processes for which cycles have been set are denoted by 1701 to 1703. Cycle patterns extracted from pieces of collection data of devices A to C are denoted by 1704 to 1706, respectively. The analysis unit 4a determines any pattern of the cycle setting to which each device belongs, and determines that, for example, the device A belongs to cycle setting 1, the device B belongs to cycle setting 2, and the device A does not correspond to any set cycle setting. Specifically, it is determined whether a value matches the number of times of a change from the start to the end of the cycle. Note that there is no problem even if start timings or end timings are slightly misaligned.

The description returns to FIG. 16. In S83, the CPU 41a adds the extracted cycle pattern to each of the devices as attribute information. Next, in S84, the CPU 41a generates a model from the operation record data acquired in S81 based on the added attribute information, and ends the processing. The generated model is master data to be used at the time of analysis, and includes at least information associated with the cycle patterns of the respective devices.

<Analysis when Learning is not Performed>

Figure 18:
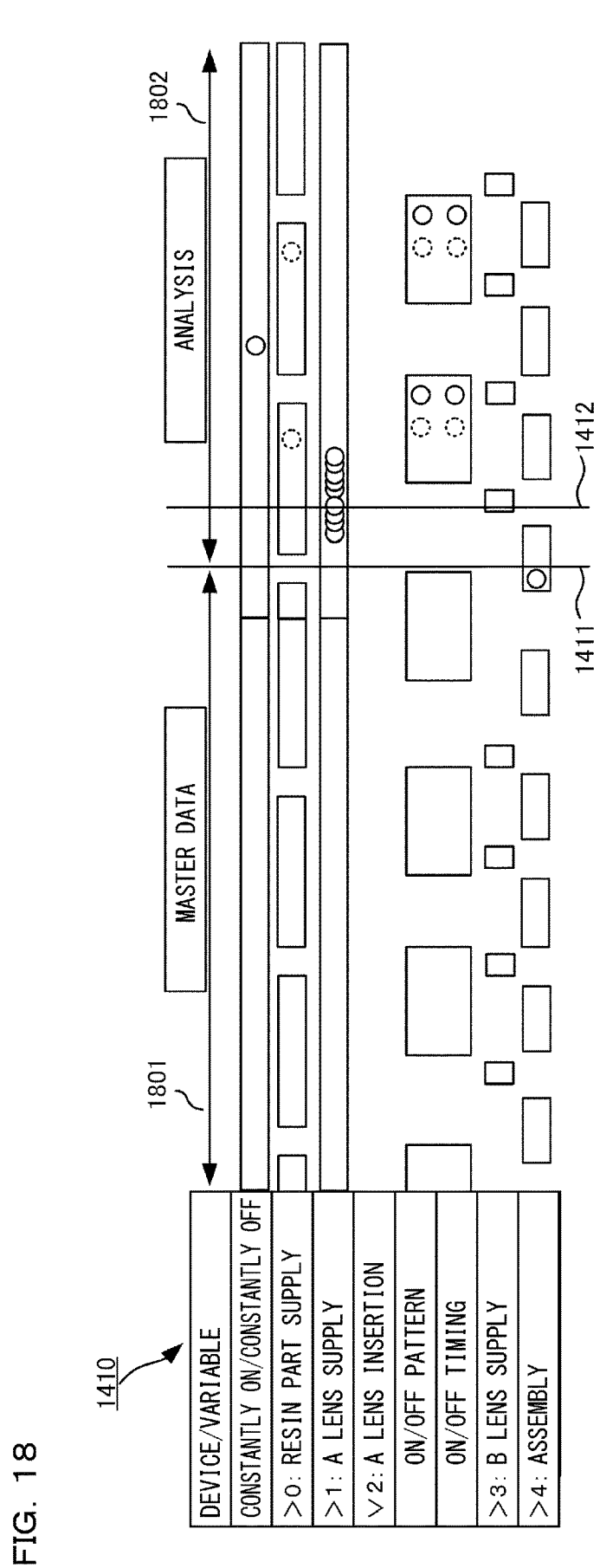
FIG. 18 is a diagram illustrating analysis control when learning is not performed.

FIG. 18 is a diagram illustrating analysis control when learning is not performed. In the above embodiment, the example in which the operation record data is analyzed in the state where the model is generated has been describe as described with reference to FIG. 10. However, a model is not generated at the time of initial startup such as when a facility of a factory has been changed or when a PLC system has been changed, and it is difficult to use a model, which has been already generated, in analysis.

However, the analysis unit 4a may first generate a model, which is master data, from data 1801 of an initial stage where no abnormality has occurred based on the operation record data acquired from the basic unit 3 at the time of performing analysis as illustrated in FIG. 18. As described above, the operation record data records data before and after the occurrence of the trigger satisfying the condition for the operation record. That is, the operation record data also include data before occurrence of any event or error, and data that has been obtained by going back to some extent from the occurrence of the trigger is highly likely to be indicate a normal operation. Therefore, the analysis can be performed even when the learning is not performed by creating a model using the data 1801 of the initial stage, considered to be the normal operation record data, and analyzing data 1802 as an analysis target Note that an area to be treated as normal data may be settable by an operator.

<Non-Setting of Cycle>

Figure 19:
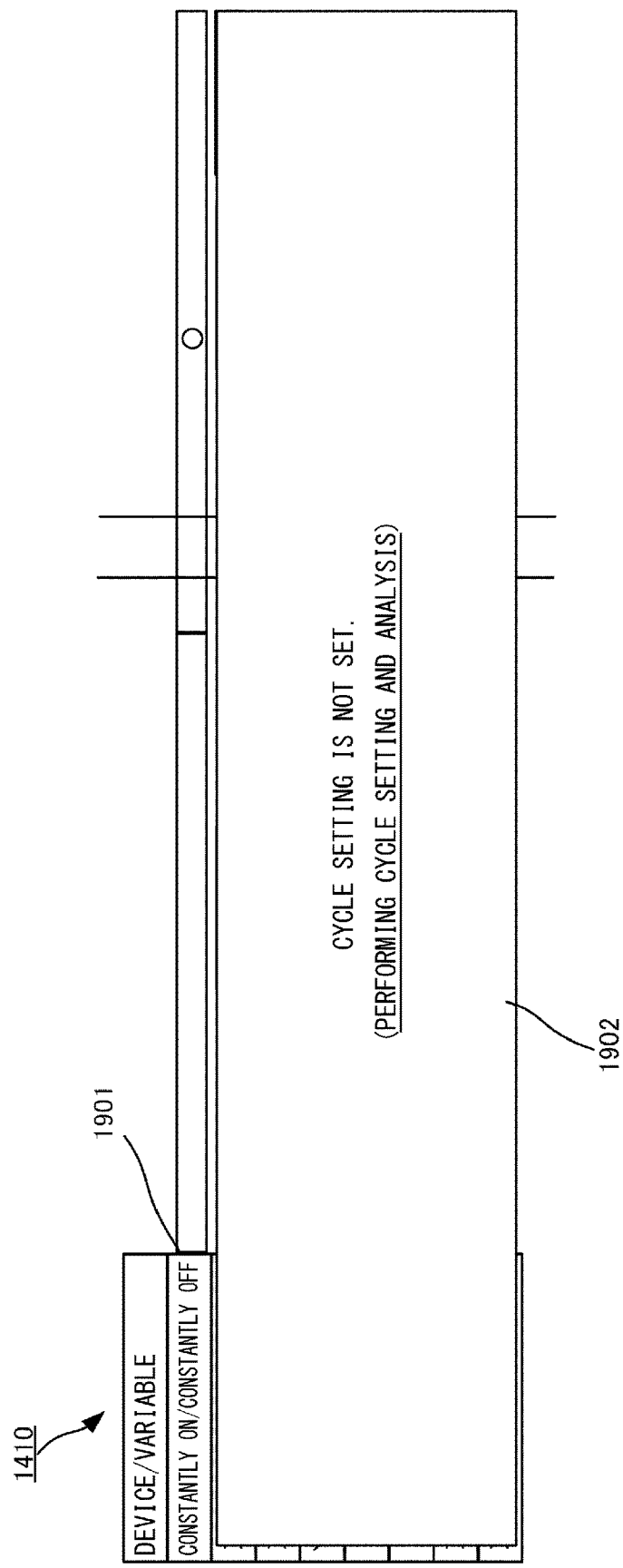
FIG. 19 is a diagram illustrating a warning in a case where a cycle is not set.

FIG. 19 illustrates the detection map 1410 of an analysis report when a cycle is not set. The analysis unit 4a can perform analysis even if the cycle is not set, but the number of analyzable devices is extremely small. That is, only devices having no cycle pattern can be analyzed. The device having no cycle pattern is, for example, a device whose device value is a fixed value and does not change. For example, as illustrated in 1901 of FIG. 19, devices which are constantly ON and constantly OFF can be analyzed even without the cycle setting. On the other hand, it is difficult to perform analysis for a device having a predetermined cycle pattern unless the cycle is not set. Since there are few analyzable devices in this manner, the analysis itself is possible when the cycle is not set, but the effectiveness of an analysis result is limited. Therefore, a message 1902 indicating that no cycle is set and urging the cycle setting may be displayed in the analysis report as illustrated in FIG. 19. When "perform cycle setting and analysis" is selected, a pop-up screen for the cycle setting is displayed, and the operator can perform the cycle setting.

<Model Reliability>

Figure 20:
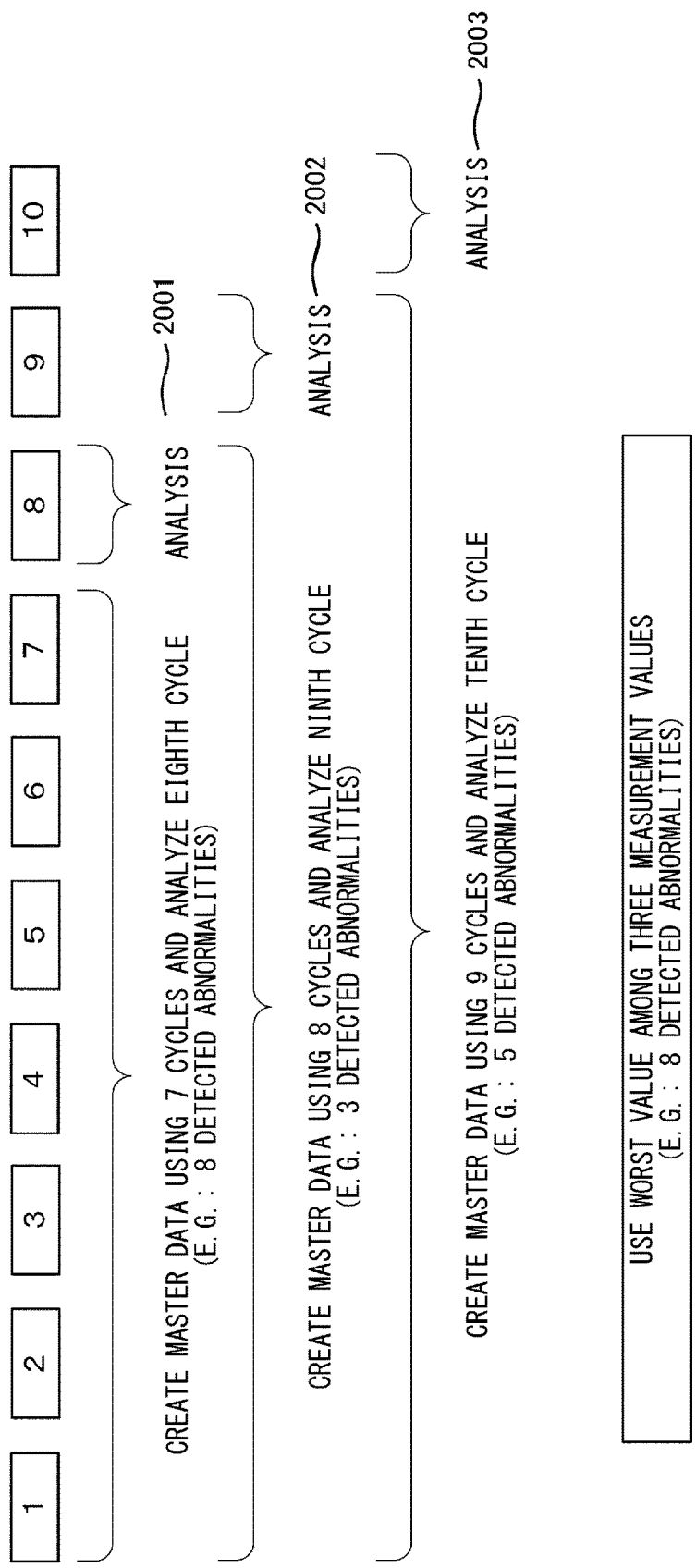
FIG. 20 is a diagram illustrating model reliability.

FIG. 20 is a diagram illustrating model reliability. The reliability of a generated model changes according to the amount of data handled at the time of generation. Therefore, the analysis unit 4a measures the reliability of the model at the time of model generation and adds the reliability to the model as attribute information. FIG. 20 illustrates how to perform model generation and analysis in a case where pieces of operation record data for 10 cycles are acquired. For example, even when the pieces of operation record data for 10 cycles are acquired, there is a possibility that the data is insufficient for an unsynchronized device or the like although being sufficient for model generation with a simple device. Therefore, it is difficult to estimate the reliability of the generated model only by the number of cycles. Therefore, the operator can determine whether a satisfactory model has been obtained if the reliability of the model can be measured and presented.

States where learning and additional learning of normal data are repeated every one cycle and data of the next cycle is analyzed are denoted by 2001 to 2003. A case where a model is generated using 7 cycles and the eighth cycle is analyzed is denoted by 2001. A case where a model is generated using 8 cycles and the ninth cycle is analyzed is denoted by 2002. A case where a model is generated using 9 cycles and the tenth cycle is analyzed is denoted by 2003. In the example illustrated in FIG. 20, for example, the number of detected abnormalities in the generated model is 8, 3, and 5 in 2001, 2002, and 2003, respectively. It is desirable that the number of detections be 0 since the data is originally normal. However, it is difficult to obtain 0 when the amount of normal data is insufficient. The number of detected abnormalities may be directly presented to the operator as the reliability, and the number of detections may be normalized as the reliability and presented. For example, the highest reliability may be set as "3" when the number of detections is 0, the reliability may be set to "2" when the number of detections is 1 to 10, the reliability may be set to "1" when the number of detections is 11 to 20, and the reliability may be set to "0" when the number of detections is 21 or more. For example, as illustrated in FIG. 20, the reliability may be acquired using a measurement value having the largest number of detections of 2001. Note that the completion of learning and the reliability of the generated model may be presented at a timing once the learning is ended, and the operator may select whether to perform additional learning. Alternatively, the learning may be repeated until a predetermined reliability is obtained.

<Modification of System Configuration>

Figure 21:
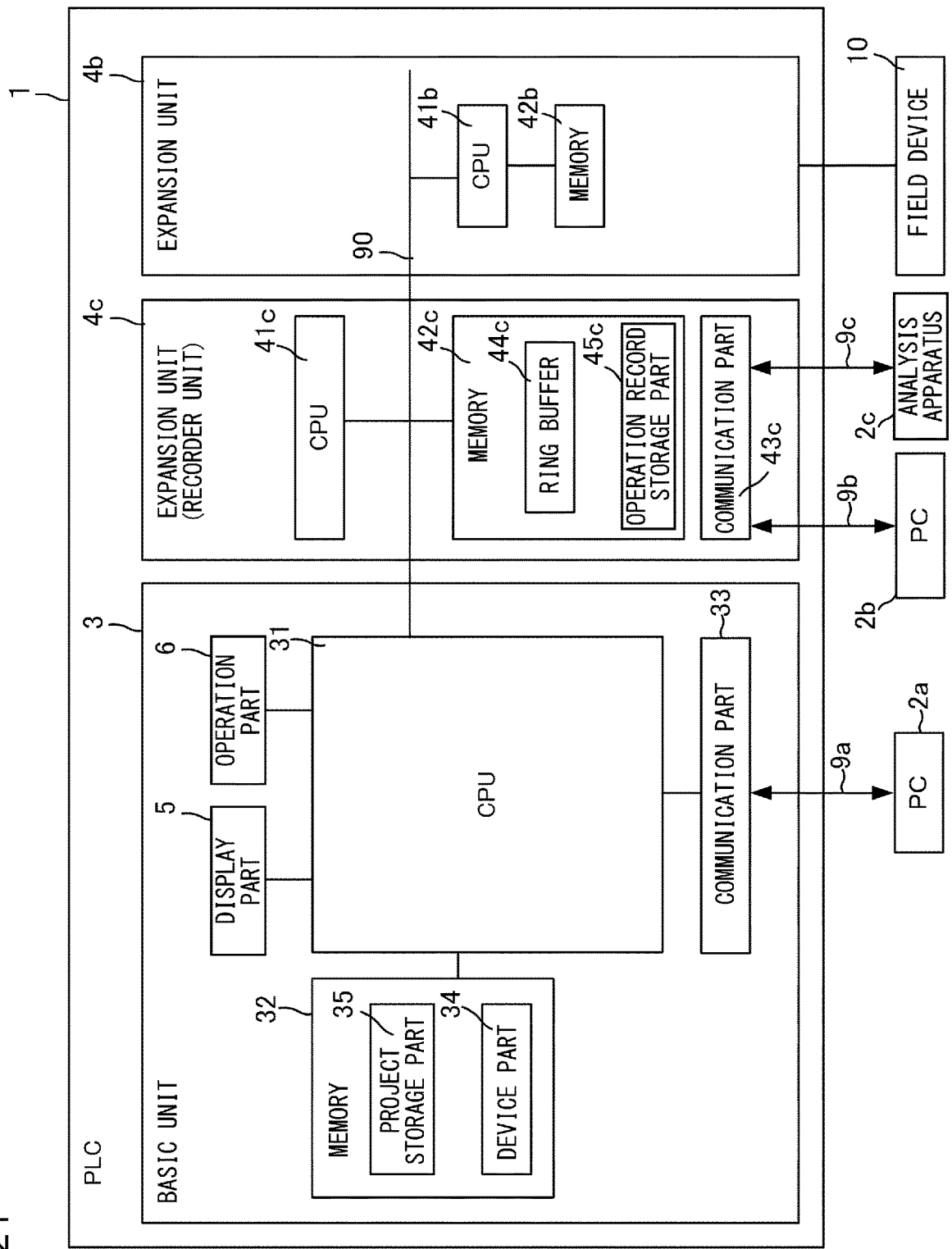
FIG. 21 is a diagram illustrating a modification of the PLC system.

FIG. 21 illustrates a modification of the PLC system configuration. In the above embodiment, the description has been given regarding the example in which the PLC system includes: the PLC 1 including the basic unit 3, the analysis unit 4a, and the expansion unit 4b such as the camera unit; the PC 2a connected to the basic unit 3; and the PC 2b that is connected to the analysis unit 4a and displays the analysis report. However, these configurations are merely examples, and the collection of the operation record data, the model generation, the analysis, and the display of the analysis result described above may be performed by any device or unit, and further, may be implemented by another external apparatus or another expansion unit. Here, the modification having such a configuration will be described.

For example, as illustrated in FIG. 21, the function of the analysis unit 4a according to the above embodiment may be implemented by an analysis apparatus 2c arranged in a high-level layer of the PLC 1. Since processing of a learning phase of a model or the like gives an extremely high processing load and requires a processing time, it can be assumed that the processing is externally implemented according to the processing capability of the PLC unit. In addition, by providing the analysis function in the apparatus in the high-level layer, information can be absorbed from other PLCs, so that a model with a higher reliability can be generated. The analysis apparatus 2c has functions such as analysis of PLC-specific information, model generation, analysis, and creation of an analysis report. Regarding these functions, the same processes as those of the analysis unit 4a are applied, and thus, descriptions thereof are omitted.

In addition, the collection of the operation record data of all the devices is performed by the basic unit 3 in the above embodiment, but may be performed by another expansion unit. For example, as illustrated in FIG. 21, a recorder unit 4c may be provided as the expansion unit. The recorder unit 4c includes a CPU 41c, a memory 42c, and a communication part 43c. The memory 42c is provided with storage areas of a ring buffer 44c and an operation record storage part 45c which are provided in the basic unit 3 in the above embodiment. Regarding collection of operation records, the same processing as that of the basic unit 3 of the above embodiment is applied, and thus, the detailed description thereof is omitted.

In this manner, the apparatuses or units that implement the processing functions described in the above embodiment can be changed within a possible range according to the present invention, and the present invention encompasses such modifications. Although the example in which the recorder unit 4c that collects the operation record data is provided separately from the basic unit 3 has been described in the above modification, the unit may be provided with a collection function and a communication function, and a storage destination may be a database connected thereto via a network. As a result, a larger volume of data can be stored, analysis can be performed far back from the occurrence time of a trigger, and data of other PLC systems can also be used.

In addition, the example in which the processing functions are implemented by the unit different from the basic unit 3 or implemented by the external apparatus has been described in the above modification. However, the basic unit 3 may be integrated with the processing functions thereof. An advantage of such a configuration is that communication processing with the other unit or external apparatus can be omitted, so that a processing load due to communication can be reduced, and the influence on PLC control can be reduced. Note that the performance in the case of integration depends on the performance of the basic unit 3, and thus, it is necessary to improve the performance of the basic unit 3.

SUMMARY

[Viewpoint 1]

The present invention relates to an analysis apparatus including: a storage section that stores attribute information regarding a device determined by analyzing information associated with a programmable logic controller; an execution engine that repeatedly executes a user program; an acquisition section that acquires operation record data including a plurality of time-series device values, the operation record data being collected by execution of the user program; and a processing section that outputs an analysis report obtained by analyzing an abnormal device that does not satisfy a normal condition regarding the acquired operation record data based on attribute information stored in the storage section. According to the present embodiment, it is possible to efficiently perform the analysis from enormous data by utilizing information other than a device and a variable held by a basic unit, and it is also possible to extract and report important data from analysis results of the enormous data.

[Viewpoint 2]

In the above embodiment, the processing section analyzes a device value related to the attribute information stored in the storage section among the plurality of device values and outputs the analysis report. According to the present embodiment, it is possible to efficiently perform the analysis from the enormous data by utilizing information other than the device and the variable held by the basic unit.

[Viewpoint 3]

In the above embodiment, the processing section analyzes the plurality of device values, and outputs an analysis result of a device value related to the attribute information stored in the storage section among analysis results of the plurality of device values as the analysis report. According to the present embodiment, it is possible to extract and report important data from the analysis results of the enormous data.

[Viewpoint 4]

According to the above embodiment, an interpretation section that interprets the PLC information and determines a symbol corresponding to a predetermined attribute is further provided. According to the present embodiment, an analysis process and an analysis report generation process can be performed by narrowing down to the determined symbol, so that efficient analysis can be performed.

[Viewpoint 5]

In the above embodiment, the PLC information includes configuration information of a unit included in the programmable logic controller, and the interpretation section interprets the configuration information of the unit to determine an attribute of the unit corresponding to a symbol. According to the present embodiment, the analysis can be performed in consideration of the configuration information of the unit of the PLC, so that analysis targets can be suitably narrowed down.

[Viewpoint 6]

In the above embodiment, the PLC information includes connection information and communication setting information of communication between a unit included in the programmable logic controller and communication equipment, and the interpretation section interprets the connection information and the communication setting information to determine an attribute of a communication partner corresponding to a symbol. According to the present embodiment, the analysis can be performed in consideration of the connection information and the communication setting information of the communication between the unit of the PLC and the communication equipment, so that analysis targets can be suitably narrowed down.

[Viewpoint 7]

In the above embodiment, the PLC information includes the user program, and the interpretation section interprets the user program to determine an attribute on the user program corresponding to a symbol. According to the present embodiment, the analysis can be performed in consideration of an analysis result of the user program, so that analysis targets can be suitably narrowed down.

[Viewpoint 8]

In the above embodiment, the attribute on the user program includes at least one of a number of uses of a symbol used in the user program, information associated with a symbol added with a comment, information associated with an input contact of a symbol, and type information of a symbol value. According to the present embodiment, the user program can be analyzed from various viewpoints.

[Viewpoint 9]

In the above embodiment, an output section that outputs a result display screen indicating the analysis report is further provided, and the result display screen includes a filter setting area that enables a condition for narrowing down display items of the analysis report to be designated. According to the present embodiment, display items of analysis results can be narrowed down, so that efficient analysis can be performed.

[Viewpoint 10]

In the above embodiment, the filter setting area enables a filter to be designated by at least one of designation of an operating cycle of a symbol, designation of attribute information, and designation of an event and an error. According to the present embodiment, display items of analysis results can be narrowed down using various items, so that the analysis can be performed from different viewpoints.

[Viewpoint 11]

According to the above embodiment, a transmission section that transmits screen information of the result display screen output from the output section to an external apparatus is further provided, and the result display screen is displayed on a display part in an operable manner in the external apparatus. According to the present embodiment, the analysis report can be transmitted to the external apparatus, and the analysis report can be analyzed by, for example, a higher-performance PC or the like, and the result display screen having more detailed analysis and abundant operating systems can be displayed.

[Viewpoint 12]

According to the above embodiment, the result display screen includes at least one of a detection map indicating a cycle of a detected abnormal symbol and a timing at which an abnormality has been detected, a detection list indicating a process and an occurrence time of the detected abnormal symbol, a camera video, and an analysis comment indicating a cause of detection of a state different from usual. According to the present embodiment, analysis results can be presented in various forms, so that an operator can perform more efficient analysis.

[Viewpoint 13]

According to the above embodiment, the detection map, the detection list, the camera video, and the analysis comment are operable in a state of being aligned with each other on a time axis. According to the present embodiment, the respective display forms can be analyzed in association with each other, so that more efficient analysis can be supported.

[Viewpoint 14]

A model generation section, which generates a learning model as master data indicating operation record data in a normal state by using the predetermined attribute for each of the symbols analyzed by the interpretation section and the operation record data, is further provided, and the processing section performs analysis by comparing the learning model generated by the model generation section with the operation record data, and detecting a symbol in a state different from usual. According to the present embodiment, the learning model according to the attribute for each symbol is generated and analyzed, so that the analysis suitable for a characteristic per symbol can be efficiently performed.

[Viewpoint 15]

In the above embodiment, when the learning model is not generated by the model generation section, the processing section causes the model generation section to generate the learning model using a part of the operation record data acquired by the acquisition section, and analyzes data other than the part of the operation record data using the generated learning model. According to the present embodiment, even when the PLC system is initially started up or the system has been changed, analysis can be performed from the time of initial operation, and the system can be operated more safely.

[Viewpoint 16]

In the above embodiment, the model generation section measures a number of false detections when normal data of the generated learning model is analyzed, and adds reliability of the learning model corresponding to the measured number of false detections to the learning model. According to the present embodiment, the operator can confirm the reliability of the learning model, and the analysis result can be more appropriately used.

[Viewpoint 17]

The present invention relates to an analysis system capable of communicating with a server apparatus and a programmable logic controller, the analysis system including: a storage section that stores PLC information different from a symbol value among pieces of information associated with the programmable logic controller; an execution engine that repeatedly executes a user program; an acquisition section that acquires operation record data including a plurality of time-series symbol values, the operation record data being collected by execution of the user program; and a processing section that outputs an analysis report obtained by analyzing an abnormal symbol that does not satisfy a normal condition regarding the acquired operation record data based on attribute information stored in the storage section. According to the present embodiment, it is possible to efficiently perform the analysis from enormous data by utilizing information other than a device and a variable held by a basic unit, and it is also possible to extract and report important data from analysis results of the enormous data.
[Viewpoint 18]

In the above embodiment, at least one of the storage section, the acquisition section, and the processing section is provided in the server apparatus. According to the present embodiment, a configuration for implementing the present invention can be flexibly incorporated into an appropriate component according to the development cost of the PLC, the performance of the server apparatus, and the like, so that the degree of freedom in system design can be improved.
[Viewpoint 19]

In the above embodiment, the programmable logic controller includes: a CPU unit comprising the execution engine; and a recorder unit that implements the storage section and the acquisition section and is provided in the programmable logic controller, and the server apparatus includes the processing section. According to the present embodiment, a configuration for implementing the present invention can be flexibly incorporated into an appropriate component according to the development cost of the PLC, the performance of the server apparatus, and the like, so that the degree of freedom in system design can be improved.

The invention is not limited to the above embodiment, and various modifications and changes can be made within a scope of a gist of the invention.

What is claimed is:

1. An analysis apparatus included in, or communicatively connected to a programmable logic controller, the programmable logic controller including: a basic unit having a processor that executes a user program using a symbol including a device or a variable; and one or more expansion units each expanding a function of the programmable logic controller, the basic unit and the one or more expansion units are connected to and communicated with each other via a bus, the analysis apparatus comprising:
 a memory that stores programmable logic controller (PLC)-specific information different from a symbol value among pieces of information associated with the programmable logic controller, the PLC-specific information including at least one of a unit configuration of the basic unit and the one or more expansion units, information associated with the symbol defining a reference timing of each operating cycle, number of uses of the symbol used in the user program, information associated with the symbol added with a comment, information associated with an input contact of the symbol, and type information of a symbol value of the symbol; and
 one or more processors configured to execute instructions that cause the one or more processors to:
 acquire operation record data for an operation record saved in response to a saved event, the operation record including a plurality of time-series symbol values of a plurality of symbols collected around the saved event for reproducing a status around the saved event, the time-series symbol values of each symbol in the operation record data being periodically collected by execution of the user program,
 analyze the plurality of time-series symbol values of the plurality of symbols collected around the saved event in the operation record data to generate an analysis report including information associated with an abnormal symbol based on the PLC-specific information stored in the memory, the abnormal symbol that does not satisfy a normal condition in the plurality of symbols, and
 output the analysis report.

2. The analysis apparatus according to claim 1, wherein the one or more processors analyze a symbol value related to the PLC-specific information stored in the memory among the plurality of symbol values and outputs the analysis report.

3. The analysis apparatus according to claim 1, wherein the one or more processors analyze the plurality of symbol values, and outputs an analysis result of a symbol value related to the PLC-specific information stored in the memory among analysis results of the plurality of symbol values as the analysis report.

4. The analysis apparatus according to claim 1,
 wherein the one or more processors interpret the PLC-specific information to determine symbols corresponding to predetermined attributes.

5. The analysis apparatus according to claim 4, wherein the PLC-specific information includes configuration information of a unit included in the programmable logic controller, and
 the one or more processors interpret the configuration information of the unit to determine an attribute of the unit corresponding to a symbol.

6. The analysis apparatus according to claim 4, wherein the PLC-specific information further includes connection information and communication setting information of communication between a unit included in the programmable logic controller and communication equipment, and
 the one or more processors interpret the connection information and the communication setting information to determine an attribute of a communication partner corresponding to a symbol.

7. The analysis apparatus according to claim 4, wherein the PLC-specific information further includes the user program, and
 the one or more processors interpret the user program to determine an attribute on the user program corresponding to a symbol.

8. The analysis apparatus according to claim 1,
 wherein the one or more processors output a result display screen indicating the analysis report,
 wherein the result display screen includes a filter setting area that enables a condition for narrowing down display items of the analysis report to be designated.

9. The analysis apparatus according to claim 8, wherein the filter setting area enables a filter to be designated by at least one of designation of an operating cycle of a symbol, designation of attribute information, and designation of an event and an error.

10. The analysis apparatus according to claim 8,
 wherein the one or more processors transmit screen information of the result display screen output to an external apparatus,
 the result display screen is displayed on a display part in an operable manner in the external apparatus.

11. The analysis apparatus according to claim 8, wherein the result display screen includes at least one of a detection map indicating a cycle of a detected abnormal symbol and a timing at which an abnormality has been detected, a detection list indicating a process and an occurrence time of the detected abnormal symbol, a camera video, and an analysis comment indicating a cause of detection of a state different from usual.

12. The analysis apparatus according to claim 11, wherein the detection map, the detection list, the camera video, and the analysis comment are operable in a state of being aligned with each other on a time axis.

13. The analysis apparatus according to claim 4, wherein the one or more processors generate a learning model as master data indicating operation record data in a normal state by using the predetermined attribute for each of the symbols and the operation record data, wherein the one or more processors perform analysis by comparing the learning model with the operation record data, and detecting a symbol in a state different from usual.

14. The analysis apparatus according to claim 13, wherein when the learning model is not generated the one or more processors generate the learning model using a part of the operation record data, and analyze data other than the part of the operation record data using the generated learning model.

15. The analysis apparatus according to claim 13, wherein the one or more processors measure a number of false detections when normal data of the generated learning model is analyzed, and adds reliability of the learning model corresponding to the measured number of false detections to the learning model.

16. An analysis system capable of communicating with a server apparatus and a programmable logic controller, the programmable logic controller including: a basic unit having a processor that executes a user program using a symbol including a device or a variable; and one or more expansion units each expanding a function of the programmable logic controller, the basic unit and the one or more expansion units are connected to and communicated with each other via a bus, the analysis system comprising:
  a memory that stores programmable logic controller (PLC)-specific information different from a symbol value among pieces of information associated with the programmable logic controller, the PLC-specific information including at least one of a unit configuration of the basic unit and the one or more expansion units, information associated with the symbol defining a reference timing of each operating cycle, number of uses of the symbol used in the user program, information associated with the symbol added with a comment, information associated with an input contact of the symbol, and type information of a symbol value of the symbol; and
  one or more processors configured to execute instructions that cause the one or more processors to
  acquire operation record data for an operation record saved in response to a saved event, the operation record including a plurality of time-series symbol values of a plurality of symbols collected around the saved event for reproducing a status around the saved event, the time-series symbol values of each symbol in the operation record data being periodically collected by execution of the user program,
  analyze the plurality of time-series symbol values of the plurality of symbols collected around the saved event in the operation record data to generate an analysis report including information associated with an abnormal symbol based on the PLC-specific information stored in the memory, the abnormal symbol that does not satisfy a normal condition in the plurality of symbols, and
  output the analysis report.

17. The analysis system according to claim 16, wherein at least one of the memory and the one or more processors is provided in the server apparatus.

18. The analysis system according to claim 17, wherein the programmable logic controller comprises:
  a recorder unit as one of the one or more expansion units having the memory and a first of the one or more processors that acquires operation record data including a plurality of time-series symbol values, the operation record data being collected by execution of the user program, and
  the server apparatus comprises a second of the one or more processors that outputs the analysis report.

19. A control method of an analysis apparatus included in, or communicatively connected to a programmable logic controller, the programmable logic controller including: a basic unit having a processor that executes a user program using a symbol including a device or a variable; and one or more expansion units each expanding a function of the programmable logic controller, the basic unit and the one or more expansion units are connected to and communicated with each other via a bus, the control method comprising:
  storing programmable logic controller (PLC)-specific information different from a symbol value among pieces of information associated with a programmable logic controller, the PLC-specific information including at least one of a unit configuration of the basic unit and the one or more expansion units, information associated with the symbol defining a reference timing of each operating cycle, number of uses of the symbol used in the user program, information associated with the symbol added with a comment, information associated with an input contact of the symbol, and type information of a symbol value of the symbol;
  acquiring operation record data for an operation record saved in response to a saved event, the operation record including a plurality of time-series symbol values of a plurality of symbols collected around the saved event for reproducing a status around the saved event, the time-series symbol values of each symbol in the operation record data being periodically collected by execution of the user program;
  analyzing the plurality of time-series symbol values of the plurality of symbols collected around the saved event in the operation record data to generate an analysis report including information associated with an abnormal symbol based on the PLC-specific information, the abnormal symbol that does not satisfy a normal condition in the plurality of symbols; and
  outputting the analysis report.

* * * * *